United States Patent
Sun et al.

(10) Patent No.: US 11,752,745 B2
(45) Date of Patent: Sep. 12, 2023

(54) SHAPE ADAPTIVE WRINKLE-DRIVEN 3D TUBULAR STRUCTURE FOR STRETCHABLE INTERACTIVE ELECTRONICS

(71) Applicant: University of Connecticut, Farmington, CT (US)

(72) Inventors: Luyi Sun, Storrs, CT (US); Songshan Zeng, Willington, CT (US); Dianyun Zhang, Storrs, CT (US); Rui Li, Dearborn Heights, MI (US)

(73) Assignee: UNIVERSITY OF CONNECTICUT, Farmington, CT (US)

( * ) Notice: Subject to any disclaimer, the term of this patent is extended or adjusted under 35 U.S.C. 154(b) by 366 days.

(21) Appl. No.: 17/000,485

(22) Filed: Aug. 24, 2020

(65) Prior Publication Data

US 2021/0053329 A1  Feb. 25, 2021

Related U.S. Application Data

(60) Provisional application No. 62/890,190, filed on Aug. 22, 2019.

(51) Int. Cl.
*B32B 27/30* (2006.01)
*B32B 7/023* (2019.01)
(Continued)

(52) U.S. Cl.
CPC .............. *B32B 27/306* (2013.01); *B32B 1/08* (2013.01); *B32B 7/022* (2019.01); *B32B 7/023* (2019.01); *B32B 7/035* (2019.01); *B32B 15/082* (2013.01); *B32B 37/12* (2013.01); *B32B 37/144* (2013.01); *B32B 38/14* (2013.01); *B32B 38/1875* (2013.01); *B32B 38/1883* (2013.01); *B32B 2037/243* (2013.01); *B32B 2038/0028* (2013.01); *B32B 2255/10* (2013.01); *B32B 2255/205* (2013.01); *B32B 2305/77* (2013.01);
(Continued)

(58) Field of Classification Search
CPC ............ B32B 2309/16; B32B 2305/77; B32B 2038/0028; B32B 2037/243; B32B 38/1883; B32B 38/1875; B32B 38/14; B32B 37/144; B32B 37/12
See application file for complete search history.

(56) References Cited

U.S. PATENT DOCUMENTS 9,782,940 B2    10/2017 Ha et al.
2018/0050524 A1*  2/2018 Sun ..................... C07D 311/82
2019/0006061 A1   1/2019 Son et al.

OTHER PUBLICATIONS

Brain J. Cafferty, Fabricating 3D Structures by Combining 2D Printing and Relaxation of Strai, Aug. 21, 2018, Advanced Science News.*

(Continued)

*Primary Examiner* — Vishal I Patel
(74) *Attorney, Agent, or Firm* — CANTOR COLBURN LLP

(57) ABSTRACT

Disclosed is a stretchable, three-dimensional tubular structure formed due to processing-induced wrinkles to result in a platform for stretchable interactive electronics. The three-dimensional tubular structure is fabricated simply by releasing a pre-stretched two-dimensional film-substrate precursor, and the resulting wrinkled surface shows a strong directional dependence that drives the tube formation.

8 Claims, 23 Drawing Sheets

(51) Int. Cl.
 B32B 7/035 (2019.01)
 B32B 1/08 (2006.01)
 B32B 15/082 (2006.01)
 B32B 7/022 (2019.01)
 B32B 37/12 (2006.01)
 B32B 37/14 (2006.01)
 B32B 38/14 (2006.01)
 B32B 38/00 (2006.01)
 B32B 37/24 (2006.01)

(52) U.S. Cl.
 CPC ..... B32B 2307/416 (2013.01); B32B 2307/51 (2013.01); B32B 2307/538 (2013.01); B32B 2309/16 (2013.01); B32B 2597/00 (2013.01)

(56) References Cited

OTHER PUBLICATIONS

Burgert, I. & Fratzl, P. "Actuation systems in plants as prototypes for bioinspired devices."; Philosophical Transactions of the Royal Society A: Mathematical, Physical and Engineering Sciences 367, 1541-1557 (2009).
Cafferty, Brian J. et al.; "Fabricating 3D Structures by Combining 2D Printing and Relaxation of Strain"; Adv. Mater. Technol., 2019, V. 4, 1-9.
Cao, Y.-P., Li, B. & Feng, X.-Q. "Surface wrinkling and folding of core—shell soft cylinders." Soft Matter 8, 556-562 (2012).
Chen, X. et al.; "Electrochromic Fiber-Shaped Supercapacitors." Advanced Materials 26, 8126-8132 (2014).
Chen, X. et al.; "Smart, Stretchable Supercapacitors." Advanced Materials 26, 4444-4449 (2014).
Cho, S., et al.; "Screen-Printable & Flexible RuO2 Nanoparticle-Decorated PEDOT:PSS/Graphene Nanocomposite with Enhanced Electrical & Electrochemical Performances for High-Capacity Supercapacitor." ACS Applied Materials & Interfaces 7, 10213-10227 (2015).
Chu, X. et al.; "A novel stretchable supercapacitor electrode with high linear capacitance." Chemical Engineering Journal 349, 168-175 (2018).
Deravi, Leila F. et al.; "The structure—function relationships of a natural nanoscale photonic device in cuttlefish chromatophores." Journal of The Royal Society Interface 11, 20130942 (2014), p. 1-9.
Ferris, A., et al.; "3D RuO2 Microsupercapacitors with Remarkable Areal Energy." Advanced Materials 27, 6625-6629 (2015).
Forterre, Y. et al.; "How the Venus flytrap snaps" Nature 433: Jan. 27, 2005, p. 421-425.
Hanlon, R.; "Cephalopod dynamic camouflage." Current Biology 17:11, R400-R404 (2007).
Harish, K. & Gokuian, C.; "Selective amyloidosis of the small intestine presenting as malabsorption syndrome" Tropical Gastroenterology, 29, 2008, p. 37-39.
Jang, Kyung-In et al.; "Self-assembled three dimensional network designs for soft electronics"; Nature Communications, 8:15894,DOI: 10.1038/ncomms15894, p. 1-10, published Jun. 21, 2017.
John A. Rogers, et al., "Materials and Mechanics for Stretchable Electronics", Science, New Series, vol. 327, No. 5973 (Mar. 26, 2010), pp. 1603-1607.
Khang, Dahl-Young et al.; "Mechanical Buckling: Mechanics, Metrology, and Stretchable Electronics"; Adv. Funct. Mater., 2008, 18, p. 1-11.
Kim, D.-H. et al.; "Flexible and Stretchable Electronics for Biointegrated Devices." Annual Review of Biomedical Engineering 14, 113-128 (2012).
Li, B., Cao, Y.-P., Feng, X.-Q. & Gao, H. "Surface wrinkling of mucosa induced by volumetric growth: Theory, simulation and experiment." Journal of the Mechanics and Physics of Solids 59, 758-774 (2011).
Li, B., Cao, Y.-P., Feng, X.-Q. & Gao, H.; "Mechanics of morphological instabilities and surface wrinkling in soft materials: a review. Soft Matter"; 8, 5728-5745 (2012).
Li, F. et al.; "Stretchable Supercapacitor with Adjustable Volumetric Capacitance Based on 3D Interdigital Electrodes." Advanced Functional Materials 25, 4601-4606 (2015).
Li, L. et al.; "Recent advances in flexible/stretchabie supercapacitors for wearable electronics"; Small 14, 1702829 (2018).
Li, M. et al. "Microarchitecture for a Three-Dimensional Wrinkled Surface Platform." Advanced Materials 27, 1880-1886 (2015).
Liu, Ying et al.; ""2D or not 2D": Shape-programming polymer sheets"; Progress in Polymer Science, 52, 2016, p. 79-106.
Lu, Z., et al.; Superelastic Hybrid CNT/Graphene Fibers for Wearable Energy Storage.: Advanced Energy Materials 8, 1702047 (2018).
Lv, T., et al.; "Highly Stretchable Supercapacitors Based on Aligned Carbon Nanotube/Molybdenum Disulfide Composites." Angewandte Chemie International Edition 55, 9191-9195 (2016).
Martinez, Ramses V. et al.; "Elastomeric Origami: Programmable Paper-Elastomer Composites as Pneumatic Actuators"; Advanced Functional Materials, 2012, V. 22, p. 1376-1384.
Martone, P. T. et al. Mechanics without Muscle: Biomechanical Inspiration from the Plant World. Integrative and Comparative Biology 50, 888-907 (2010).
Mäthger, L. et al., "Mechanisms and behavioural functions of structural coloration in cephalopods", J. R. Soc. Interface (2009) 6, S149-S163, doi:10.1098/rsif.2008.0366.focus, 15 Pages.
Narita, T., et al.; "Viscoelastic Properties of Poly(vinyl alcohol) Hydrogels Having Permanent and Transient Cross-Links Studied by Microrheology, Classical Rheometry, and Dynamic Light Scattering". Macromolecules 46, 4174-4183 (2013).
Ning, X. et al.; "Mechanically active materials in three-dimensional mesostructures." Science Advances 4, eaat8313 (2018).
Rogers, J. A. et al.; "Materials and Mechanics for Stretchable Electronics"; Science 327, 1603-1607 (2010).
Sun, Yugang et al.; "Controlled buckling of semiconductor nanoribbons for stretchable electronics"; Articles, Published online: Dec. 5, 2006; doi:10.1038/nnano.2006.131, p. 201-207.
Volkov, A. G. et al.; Mimosa pudica: Electrical and mechanical stimulation of plant movements. Plant, Cell & Environment 33, p. 163-173 (2010).
Wang, S., Oh, J. Y., Xu, J., Tran, H. & Bao, Z. Skin-Inspired Electronics: An Emerging Paradigm. Accounts of Chemical Research 51, 1033-1045 (2018).
Weintraub, M.; "Leaf Movements in Mimosa pudica L." The New Phytologist 50:3, Jan. 1952, p. 357-382.
Wu, Chen et al.; "Efficient Mechanoluminescent Elastomers for Dual-Responsive Anticounterfeiting Device and Stretching/Strain Sensor with Multimode Sensibility"; Advanced Functional Materials 28, 1803168 (2018) p. 1-8.
Xie, Y. et al. "Stretchable all-solid-state supercapacitor with wavy shaped polyaniline/graphene electrode." Journal of Materials Chemistry A 2, 9142-9149 (2014).
Xiong, G., et al.; "Thermal effects in supercapacitors." Summary of Chapter 2: Thermal Considerations for Supercapacitors, (Springer, 2015).
Xu, Feng et al.; "Controlled 3D Buckling of Silicon Nanowires for Stretchable Electronics"; ACSNANO, V. 5: 1, p. 672-678, published Dec. 28, 2010.
Xu, S. et al. "Assembly of micro/nanomaterials into complex, three-dimensional architectures by compressive buckling"; Science 347, 154-159 (2015).
Yan, Z. et al.; "Mechanical assembly of complex, 3D mesostructures from releasable multilayers of advanced materials." Science Advances 2, e1601014 (2016).
Zeng, S. et al. "Multi-Responsive Wrinkling Surfaces with Tunable Dynamics", Advanced Materials, 2017, vol. 29, 1700828, 7 Pages.
Zeng, S. et al., "Bio-inspired sensitive and reversible mechanochromisms via strain-dependent crack andfolds", Nature Communications, Jul. 8, 2016, DOI: 10.1038/ncomms11802, 9 Pages.
Zhang, Y. et al.; "A mechanically driven form of Kirigami as a route to 3D mesostructures in micro/nanomembranes." Proceedings of the National Academy of Sciences 112, 11757-11764 (2015).

(56) References Cited

OTHER PUBLICATIONS

Zhang, Y. et al.; "Printing, folding and assembly methods for forming 3D mesostructures in advanced materials." Nature Reviews Materials 2, 17019 (2017).
Zhang, Z. et al.; "Superelastic Supercapacitors with High Performances during Stretching." Advanced Materials 27, 356-362 (2015).
Zhao, Juan et al.; "Recent developments of truly stretchable thin film electronic and optoelectronic devices" Nanoscale, 2018, 10, p. 5764-5792.
Zhao, R. et al.; "Multimodal Surface Instabilities in Curved Film—Substrate Structures." Journal of Applied Mechanics 84, 081001-081001-081013 (2017).

* cited by examiner

EXPERIMENTAL RESULT

PRE-STRETCHING 450%
W/T = 30

PRE-STRETCHING 95%
W/T = 17

SHAPE ADAPTIVE WRINKLE-DRIVEN 3D TUBULAR STRUCTURE FOR STRETCHABLE INTERACTIVE ELECTRONICS

CROSS-REFERENCE TO RELATED APPLICATIONS

This application claims priority to U.S. provisional application Ser. No. 62/890,190, filed Aug. 22, 2019, the contents of which are hereby incorporated by reference it its entirety for all purposes.

BACKGROUND

Exceptional shape/skin's color adaptivity and dynamic self-assemblies are ubiquitously demonstrated in various biological systems. They can respond to environmental stimuli (such as mechanical force, temperature, light and so on) by exhibiting spontaneous actions and/or autonomous shape/surface color re-organization. For instance, Mimosa pudica, it can rapidly fold its leaves inward when subject to tactile touching. This adaptation is driven by electrical potential, mechanical and hydrodynamical response, considering as a defensive mechanism against external stimuli. Another vivid sample, Cephalopod, enabling to dynamically tune skin color/texture by the contraction/relaxation of the skin muscle to modulate the pigment area, serving as a camouflage against predators. Additionally, surface instabilities, manifested as a shape/pattern adaptive system, can be found in a variety of film-substrate biological structures, including three-dimensional (3D) curved/tubular shapes. For example, Jejunum, a part of human small intestine, has a tubular structure containing wrinkled tissues on the inner surface, allowing greater surface area for digestion. Those three types of creature/body part set as captivated samples for the Mother Nature's magnificent structural/color flexibility. If some similar unique 3D geometries coupling with self-organized shape/color adaptivity can be developed, it will impart unprecedented stimuli responsive and 3D geometric-driven properties for advanced materials systems like stretchable electronics. While two-dimensional (2D) planar structures are mainly focused on in this field, efforts of fabricating electronic devices in 3D geometries via the strain relaxation from a pre-strained 2D film-substrate precursor system haven't been achieved until recently. These 3D electronics demonstrate enhanced performances and broader working angles compared to their 2D counterparts. However, in those designs, the substrate remains original 2D planar geometry while the thin film buckled into various out-of-plane 3D shapes due to selective interfacial delamination.

There remains a need in the art for the preparation of stretchable, three-dimensional (3D) interactive electronics.

SUMMARY

In an embodiment, a stretchable three-dimensional tubular structure comprises a multilayer film comprising a first polymer layer or a first polymer composite layer bonded to a first elastomer layer, wherein the first polymer composite layer comprises a polymer and an inorganic material; the multilayer film is substantially to fully tubular in structure comprising an openable seam; the first elastomer layer forming an outer surface of the tubular structure; and the first polymer layer or first polymer composite layer forming an inner surface of the tubular structure, wherein the inner surface has a wrinkled morphology. The stretchable three-dimensional tubular structure with an inner surface having a wrinkled morphology can be prepared by pre-stretching and releasing a multilayer precursor film.

In another embodiment, a method of making the stretchable three-dimensional tubular structure comprises providing a multilayer precursor film comprising a first polymer precursor layer bonded to a first elastomer precursor layer; pre-stretching and releasing the multilayer precursor film to form the multilayer film that is substantially to fully tubular in structure and comprises an openable seam, the first elastomer layer forming an outer surface of the tubular structure and the first polymer layer forming an inner surface of the tubular structure, wherein the inner surface has a wrinkled morphology; and optionally repeating the pre-stretching and releasing for 2 or more cycles. If the seam is not sealed, the seam of the stretchable three-dimensional tubular structure can be opened upon re-stretching and closed or folded upon releasing from the stretch. If the seam is sealed, the tubular structure remains closed or folded upon re-stretching and releasing.

DETAILED DESCRIPTION

Figure 1A:
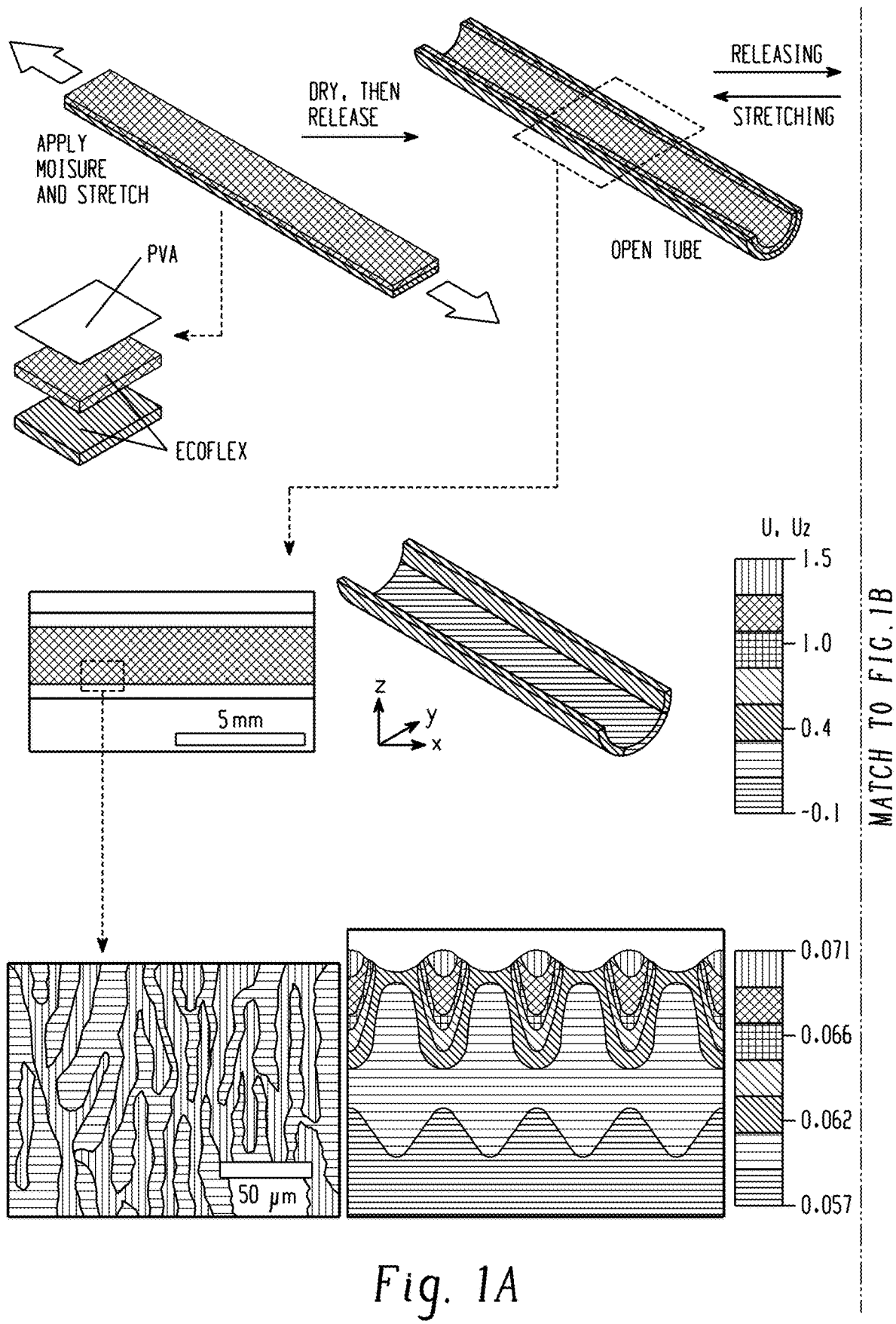
FIG. 1A and FIG. 1B illustrate a fabrication schematic of the PVA-Ecoflex® tubular geometry, and the simulated and experimental results for 3D tubular/curved structure, and the wrinkled morphologies on PVA thin film as released (both experimental and simulated PVA-Ecoflex® tubular structure has a width/thickness ratio=20 and pre-stretching strain of 450. The PVA layer is shown in the exploded view of FIG. 1A, but as it is clear it is not indicated in the remaining structures of FIG. 1A and FIG. 1B.

A stretchable, three-dimensional (3D) tubular structure formed due to processing-induced wrinkles is proposed for the first time as a platform to develop stretchable interactive electronics. This integrated structure is fabricated simply by releasing a pre-stretched 2D film-substrate precursor, and the resulting wrinkled surface shows a strong directional dependence that drives the tube formation. This unique 3D shape adaptivity can control the open and close of the tube through a longitudinal strain, which inspires the development of (1) a dual-level sensitivity strain sensor concomitant with mechanochromic effect and (2) an intriguing tactile responsive artificial mimosa device. In addition, the system is also compatible with modern 2D film deposition technologies, which allows customized electrode patterns to be coated on the pre-stretched 2D flat precursor. Once released, a 3D tubular structure forms with the electrodes wrapped inside. Upon sealing the tube seam, this "coated and wrapped" features allow the invention of a wearable and highly stretchable tactile switch, and a stretchable tubular supercapacitor with dual stimuli-responsiveness.

If the seam is not sealed, the strain at x direction can drive an angular tube opening/folding at y-z plane. This unique 3D reconfiguration can inspire the development of a strain sensor having dual-level sensitivities coupled with mechanochromic effect and an intriguing artificial mimosa device mimicking tactile response of leaves folding/releasing of plant *Mimosa*. This reconfigurable structure can be further applied into other widespread applications that needs the 3D geometry deforming, shape morphing, actuating, and so on. Furthermore, this 3D tubular structure, can enclose arbitrary electrode patterns that pre-coated on the 2D precursor, demonstrating high compatibility with modern 2D processing technologies. If the seam is sealed, this tubular structure can act as an adaptive soft scaffold to provide the electrodes with good stretchability, loading capacity, and stimuli responsive chromic external skin. Thus, a highly stretchable tubular tactile switch and stretchable tubular supercapacitor with dual-responsive skin with high specific capacitance were developed. This "coated and wrapped" 3D device design strategy can be readily materialized from the common 2D methods and it's believed that it will inspire numerous other 3D stretchable electronics with unprecedented functionalities.

This reconfigurable and adaptive 3D tubular structure fabricated from a 2D precursor with a film-substrate "collective deformation" feature, holding new essential geometrical related functions, higher degrees of freedoms for broader adaptivity, as compared to 2D counterparts, allowing us to make a set of fascinating applications for unconventional stretchable interactive electronics.

This 3D tubular structure is easy to be fabricated from a 2D precursor without the need of special equipment. The raw materials used are of low cost and widely available. The 3D tubular structure can be used for stretchable electronics. The preparation of the 3D tubular structure is facile and compatible with modern 2D film deposition technologies, which allows customized electrode patterns to be coated on the pre-stretched 2D flat precursor.

In general, the stretchable three-dimensional tubular structure comprises a multilayer film comprising a first polymer layer or a first polymer composite layer, wherein the first polymer layer or the first polymer composite layer is bonded to a first elastomer layer, wherein the first polymer composite layer comprises a polymer and an inorganic material; the multilayer film is substantially to fully tubular in structure comprising an openable seam; the first elastomer layer forming an outer surface of the tubular structure; and the first polymer layer or first polymer composite layer forming an inner surface of the tubular structure, wherein the inner surface has a wrinkled morphology. The pre-stretching and releasing of a multilayer precursor film for one or more cycles can form the stretchable three-dimensional tubular structure with an inner surface having a wrinkled morphology. The wrinkled surface can have an orientation substantially vertical to the longitudinal releasing (x–) direction. As used herein "pre-stretching and releasing" refers to the process of stretching and releasing the stretch on a multilayer precursor film in a process to prepare a stretchable three-dimensional tubular structure. The "pre-stretching and releasing" can be conducted one or more times (i.e., one or more cycles of pre-stretching and releasing) in the process to prepare the stretchable three-dimensional tubular structure. Once a desired stretchable three-dimensional tubular structure is achieved, the stretchable three-dimensional tubular structure can be stretched with strain and released with controlled opening and closing or folding of the tubular shape.

The pre-stretching and releasing of the multilayer precursor film in the process to prepare the stretchable three-dimensional tubular structure can be conducted one or more cycles, specifically 1 to about 10 cycles or more, specifically 2 to about 8 cycles, more specifically 4 to about 6 cycles. The pre-stretching of the multilayer precursor film comprises applying up to a 900% uniaxial tensile strain, specifically up to about 450% uniaxial tensile strain, specifically up to about 200% uniaxial tensile strain, specifically about 50% to about 100% uniaxial tensile strain, specifically about 5% to about 50% uniaxial tensile strain. The releasing can be a full release to 0% strain or a partial release to a strain below that of the pre-stretching.

Once formed, the stretching and releasing of the stretchable three-dimensional tubular structure can be conducted one or more cycles, specifically 1 to about 10,000 cycles or more, specifically 100 to about 7,000 cycles, more specifically 1,000 to about 5,000 cycles. The stretching of the stretchable three-dimensional tubular structure comprises applying up to a 900% uniaxial tensile strain, specifically up to about 450% uniaxial tensile strain, specifically up to about 200% uniaxial tensile strain, specifically about 50% to about 100% uniaxial tensile strain, specifically about 0% to about 50% uniaxial tensile strain. The releasing can be a full release to 0% strain or a partial release to a strain below that of the stretch.

As used herein, "bonded" or "connected" means either physically or chemically connected, or a combination comprising at least one of the foregoing. "Layer" does not necessarily mean there is a uniformly thick coating, or that there are no defects, holes, thickness deviations, or other imperfections.

In an embodiment, the multilayer film further comprises one or more additional polymer layers or polymer composite layers, one or more additional elastomer layers, or a combination thereof.

The first polymer layer comprises a polymer, wherein the polymer is polyvinyl alcohol, polyvinyl butyral, polycarbonate, poly(methyl methacrylate), a polyacrylate, polystyrene sulfonate, polyacrylic acid, polyethylenimine, any non-crosslinked polymer, or a combination thereof.

The first polymer composite layer comprises a polymer and an inorganic material wherein the polymer is polyvinyl alcohol, polyvinyl butyral, polycarbonate, poly(methyl methacrylate), a polyacrylate, polystyrene sulfonate, polyacrylic acid, polyethylenimine, any non-crosslinked polymer, or a combination thereof. The inorganic material of the first polymer composite layer can be a metal, a metal salt, a nonmetal, a nonmetal salt, a metalloid, a metalloid salt, or a combination thereof. The inorganic material can be 0-dimension particle, 1-dimension rods/tubes/fibers, 2-dimension sheets; or a combination thereof. In an embodiment, the inorganic comprises titanium dioxide; laponite; aluminum oxide; magnesium oxide; zinc(II) oxide; montmorillonite; halloysite; kaolinite; Au; Pd; Ag; Al; or a combination thereof.

The first elastomer layer comprises an elastomer, wherein the elastomer is a silicone rubber, a polyurethane rubber, a polyacrylate rubber, an acrylic rubber, natural rubber, a fluoroelastomer, ethylene-propylene rubber (EPR), ethylene-butene rubber, ethylene-propylene-diene monomer rubber (EPDM), epichlorohydrin rubber, an acrylate rubber, hydrogenated nitrile rubber (HNBR), a styrene-butadiene-styrene (SBS), a styrene-butadiene rubber (SBR), a styrene-(ethylene-butene)-styrene (SEBS), an acrylonitrile-butadiene-styrene (ABS), an acrylonitrile-ethylene-propylene-diene-styrene (AES), a styrene-isoprene-styrene (SIS), styrene-(ethylene-propylene)-styrene (SEPS), methyl methacrylate-butadiene-styrene (MBS), a high rubber graft (HRG), a polydimethylsiloxane (PDMS), or a combination thereof. The fluoroelastomer may comprise a copolymer of hexafluoropropylene and vinylidene fluoride; a terpolymer of tetrafluoroethylene, vinylidene fluoride and hexafluoropropylene; perfluoromethylvinylether; or a combination thereof. In an embodiment, the first elastomer layer further comprises a dye, a pigment, a thermochromic colorant material, or a combination thereof.

If the seam is not sealed, the seam of the stretchable three-dimensional tubular structure can be opened upon re-stretching and closed or folded upon releasing from the stretch. In another embodiment, the stretchable three-dimensional tubular structure comprises the multilayer film as substantially to fully tubular structure comprising an openable seam where the openable seam is sealed by stretchable adhesive to form an interior region of the structure. The interior region of the structure can comprise an electrolyte. The electrolyte may include metal salts, organic salts (e.g., ionic liquids), inorganic salts, and the like, and a combination thereof. Exemplary electrolytes include an alkali metal ion of Li, Na, or K. Exemplary electrolytes, where M represents an alkali metal ion, include $MClO_4$, $MPF_6$, $MBF_4$, $MAsF_6$, $MSbF_6$, $MCF_3SO_3$, $MCF_3CO_2$, $M_2C_2F_4(SO_3)_2$, $MN(CF_3SO_2)_2$, $MN(C_2F_5SO_2)_2$, $MC(CF_3SO_2)_3$, $MC_nF_{2n+1}SO_3$ ($2 \leq n \leq 3$), $MN(RfOSO_2)_2$ (wherein Rf is a fluoroalkyl group), MOH, or a combination thereof. Suitable electrolytes include a lithium salt, more particularly, the lithium salt is lithium trifluoromethanesulfonate. Other suitable salts include tetra-n-butylammonium tetrafluoroborate ($TBABF_4$); tetra-n-butylammonium hexafluorophosphate ($TBAPF_6$); or a combination thereof. When the seam is sealed, the tubular structure remains closed or folded upon re-stretching and releasing.

The electrolyte may contain an ionic liquid. Ionic liquids are organic salts with melting points under about 100° C. Other ionic liquids have melting points of less than room temperature (~22° C.). Examples of ionic liquids that may be used at the electrolyte include imidazolium, pyridinium, phosphonium or tetralkylammonium based compounds, for example, 1-ethyl-3-methylimidazolium tosylate, 1-butyl-3-methylimidazolium octyl sulfate; 1-butyl-3-methylimidazolium 2-(2-methoxyethoxy)ethyl sulfate; 1-ethyl-3-methylimidazolium bis(pentafluoroethylsulfonyl)imide; 1-ethyl-3-methylimidazolium bis(trifluoromethylsulfonyl)imide; 1-ethyl-3-methylimidazolium bromide; 1-ethyl-3-methylimidazolium hexafluorophosphate; 1-butyl-3-methylimidazolium bromide; 1-butyl-3-methylimidazolium trifluoromethane sulfonate; 1,2-dimethyl-3-propylimidazolium tris(trifluoromethylsulfonyl)methide; 1,2-dimethyl-3-propylimidazolium bis(trifluoromethylsulfonyl)imide; 3-methyl-1-propylpyridinium bis(trifluormethylsulfonyl)imide; 1-butyl-3-methylpyridinium bis(trifluormethylsulfonyl)imide; 1-butyl-4-methylpyridinium chloride; 1-butyl-4-methylpyridinium hexafluorophosphate; 1-butyl-4-methylpyridinium tetrafluoroborate; 1-n-butyl-3-methylimidazolium hexafluorophosphate (n-BMIM $PF_6$); 1-butyl-3-methylimidazolium tetrafluoroborate (BMIM $BF_4$); phosphonium dodecylbenzenesulfonate; phosphonium methanesulfonate; and mixtures of these. In an embodiment, the electrolyte is an ionic liquid, for example 1-ethyl-3-methylimidazolium tetrafluoroborate (EMIM $BF_4$).

The stretchable adhesive that can be used to seal the seam can include, for example, a room-temperature-vulcanizing silicone adhesive.

The stretchable three-dimensional tubular structure can be prepared as an article, for example as a stretchable electronic device, a supercapacitor, a tactile switch, a pressure switch, or a strain sensor.

A method of making a stretchable three-dimensional tubular structure comprises providing a multilayer precursor film comprising a first polymer precursor layer bonded to a first elastomer precursor layer; pre-stretching and releasing the multilayer precursor film to form the multilayer film that is substantially to fully tubular in structure and comprises an openable seam, the first elastomer layer forming an outer surface of the tubular structure and the first polymer layer forming an inner surface of the tubular structure; and optionally repeating the pre-stretching and releasing for 2 or more cycles. The process of pre-stretching and releasing the multilayer precursor film results in the formation of a three-dimensional tubular structure with an inner surface having a wrinkled morphology.

In an embodiment, the first polymer precursor layer comprises a polymer. In another embodiment, the first polymer precursor layer is a first polymer composite precursor layer comprising a polymer and an inorganic material. The method further comprises providing the first polymer precursor layer; and bonding the first elastomer precursor layer on a surface of the first precursor polymer layer to form the multilayer precursor film. The method further comprises applying one or more of the following to the multilayer precursor film: a reflective or mirror layer; a metal oxide layer; a thermochromic layer; a second elastomer layer; an adhesive layer; a metal coating layer; a carbon coating layer; a conducting polymer layer; and an electroactive layer.

In an embodiment of the method, the adhesive layer, the metal coating layer, the carbon coating layer, the conducting polymer layer, and the electroactive layer are positioned on the side of the multilayer precursor film closest to the first polymer precursor layer and are applied after a pre-stretching and before releasing.

In an embodiment of the method, the metal oxide layer, the reflective or mirror layer, the thermochromic layer, and the second elastomer layer are positioned on the side of the multilayer precursor film closest to the first elastomer precursor layer and are applied before pre-stretching the multilayer precursor film.

Disclosed herein is a new method to achieve a stretchable, integrated 3D tubular structure simply by releasing a pre-stretched film-substrate precursor (e.g. the multilayer precursor film, here a bilayer, comprising a first polymer precursor layer ("film") bonded to a first elastomer precursor layer ("substrate"), that causes wrinkles to form on the top surface due to the compression from the substrate. These wrinkles modify the effective properties of the film such that when the substrate is released, the film tends to contract longitudinally (along the pre-stretch direction) without causing expansion in the transverse direction. However, the release of the substrate induces transverse expansion due to the Poisson's effect, resulting in bending of the bilayer since the substrate expands more than the film. The further release of the bilayer introduces an increased bending curvature, and eventually, a tubular structure is formed. These "collectively deformed" 3D geometries can impart distinct and intriguing reconfigurable adaptive motions.

Herein, by adopting the "collective deformation" design strategy, preparation of a tubular structure with openable seam and internal wrinkles can be fabricated from the strain relaxation of a pre-stretched 2D precursor with appropriate geometrical parameters. Both experimental results and finite element (FE) simulations reveal that the width/thickness ratio (W/T) of the substrate and the pre-stretch strain level are the two factors to form a closed tubular structure. The unique strain-driven angular opening/folding characteristic of this tubular structure allows the invention of (1) a remarkable tubular piezoresistive strain sensor with dual-level sensitivities coupled with mechanochromic effects, and (2) a tactile sensitive artificial mimosa device mimicking the pressure responsive leaves folding/opening of *Mimosa pudica*. Furthermore, since this 3D geometry highly compatible with the-state-of-art 2D film deposition technologies, the electrodes with arbitrary patterns can be coated on the pre-strained 2D precursor, followed by released to form the tube that wrap the electrodes on the internal wrinkled surface, and then sealed the seam. This sealed tubular geometry made by a simple "coated and wrapped" method can act as an adaptive soft scaffold. And it can provide the electrodes with an outer protective layer, good stretchability, 3D structural stability, internal empty spacing, liquid/viscous guest materials loading capacity, stimuli responsive chromic external skin and so on. Thus, we developed highly stretchable tactile switch only sensitive to pressure in the through-thickness (z–) direction and insensitive to the stretching in the longitudinal (x–) direction. A tubular-shaped supercapacitor filled with ionic liquid and equipped with a dual responsive external skin was also prepared, and it demonstrated color change with different styles as stretched and as heated, respectively. Overall, we first introduce a reconfigurable and adaptive 3D tubular structure fabricated from a 2D precursor with a film-substrate "collectively deformed" feature, holding new essential functions and higher degrees of freedoms for broader adaptivity, as compared to 2D counterparts, allowing us to make a set of fascinating applications for unconventional stretchable interactive electronics.

Figure 1B:
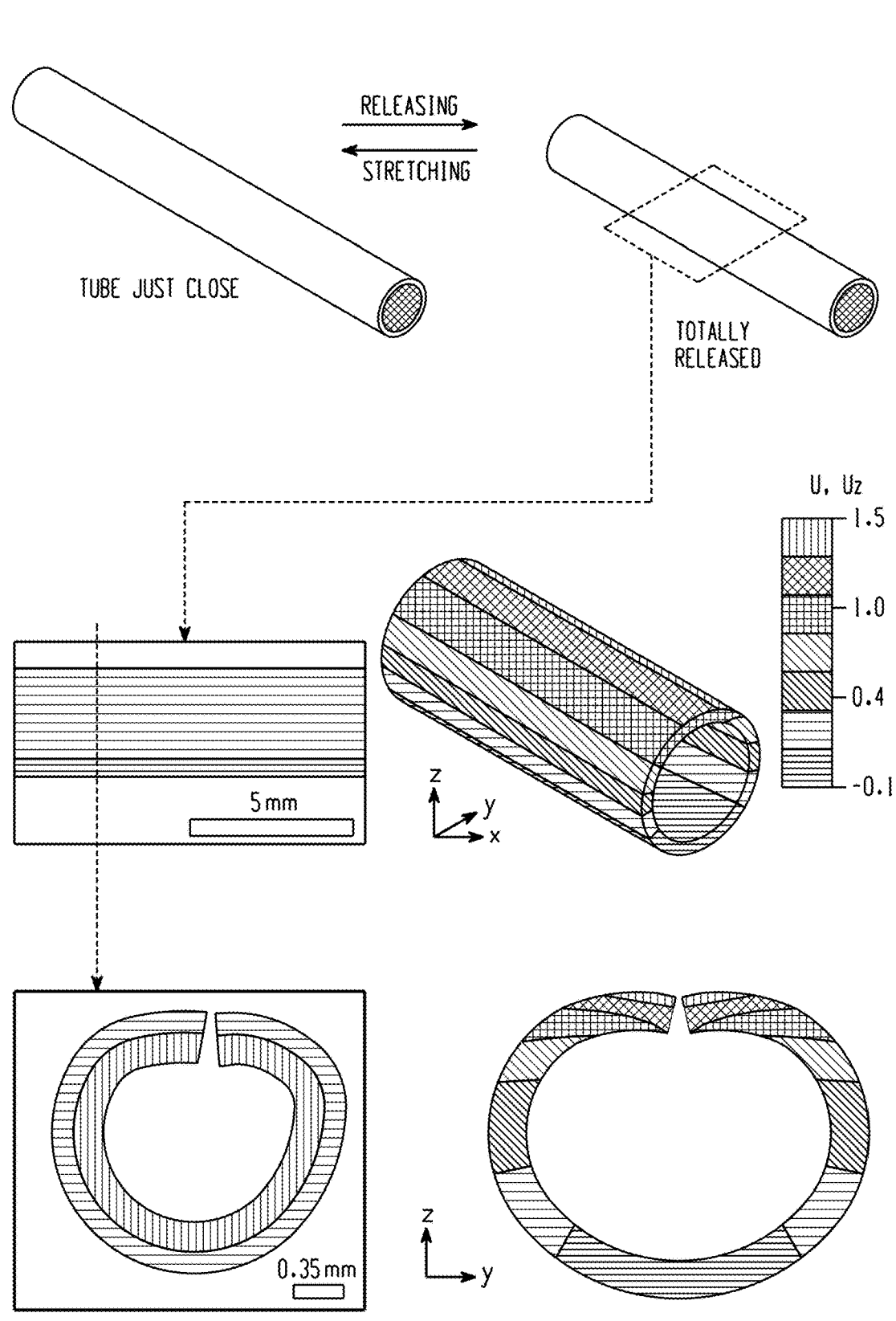

The fabrication of this 3D tubular geometry is schematically shown in FIGS. 1A and 1B. For the sake of clarity and simplicity, we have shown in FIG. 1A and FIG. 1b (as well as in FIG. 4), a blue color, a green color, a yellow color, an orange color, and a red color, etc. by using different hatched markings (e.g., U,Uz scales). For simplicity of the figures, we have drawn boundary lines between these colors (e.g., between red and orange), but it should be understood that the transition from one color to the next is gradual and not abrupt. The poly (vinyl alcohol) (PVA)-Ecoflex® film-substrate bilayer (poly (vinyl alcohol) (PVA) film is "a first polymer layer"; and the Ecoflex® substrate is "a first elastomer layer") with covalent bonding (see FIG. 2 for the fabrication of PVA-Ecoflex® bilayer; in the exploded view it shows the red-colored Ecoflex® layer between the PVA layer and the green-colored Ecoflex® layer—again the two Ecoflex® layers are a single elastomer layer) is exposed to a cool water mist (relative humidity>100%) to fully plasticize PVA followed by immediately stretched to predetermined strain. Subsequently, the bilayer is dried and then releasing to initially form an out-of-plane curved shape with a wrinkled PVA surface. Further releasing will increase of the curvature and the curved bilayer is just close and form a tubular structure at certain releasing strain (denoted as tube just close stage), and it is openable upon re-stretching. The tubular geometry can be maintained even after totally released. The corresponding experimental results shown in FIG. 1A and FIG. 1B are based on a bilayer structure with a substrate W/T ratio of 20 and a pre-stretching strain of 450%. For the experiment the "bilayer" structure was prepared from a layer of clear PVA overlaying a red-colored layer of ECOFLEX, which in turn overlayed a green-colored layer of ECOFLEX so that the red-colored layer was sandwiched in between the PVA and green-colored layer, where the combined red- and green-colored ECOFLEX layers together functioned as a single elastomer layer. The use of the green and red colored layers of the elastomer layer allowed for ease in visualizing interior and exterior regions of the resulting three-dimensional tubular structure. The PVA layer is shown in the exploded view of FIG. 1A, but as it is clear it is not indicated in the remaining structures of FIG. 1A and FIG. 1B. The wrinkled surface formed during the releasing process had an average wavelength of 16.6 μm with orientation vertical to the longitudinal releasing (x–) direction. As the bilayer structure totally released, it exhibits a tubular structure with an openable seam and a circular cross-section shape at the y-z plane with an inner diameter ca. 1.38 mm.

The formation of the tubular geometry is also investigated through FE analysis using the commercial software Abaqus (version 6.14-2). Since the wrinkled film shows a strong anisotropic constitutive response, it is modeled using rebar elements such that the film is reinforced in the transverse direction while it has a low compressive modulus in the longitudinal direction. The space between the rebars is determined based on the wrinkle wavelength, which is given in Equation (1) herein.

The hyperelastic substrate is modeled using the neo-Hookean model, which can expand transversely when it undergoes longitudinal compression. Therefore, when the bilayer is released from the pre-stretch state, it tends to bend since the bottom substrate deforms more than the top film, which is evident in the FE simulation.

Figure 3:
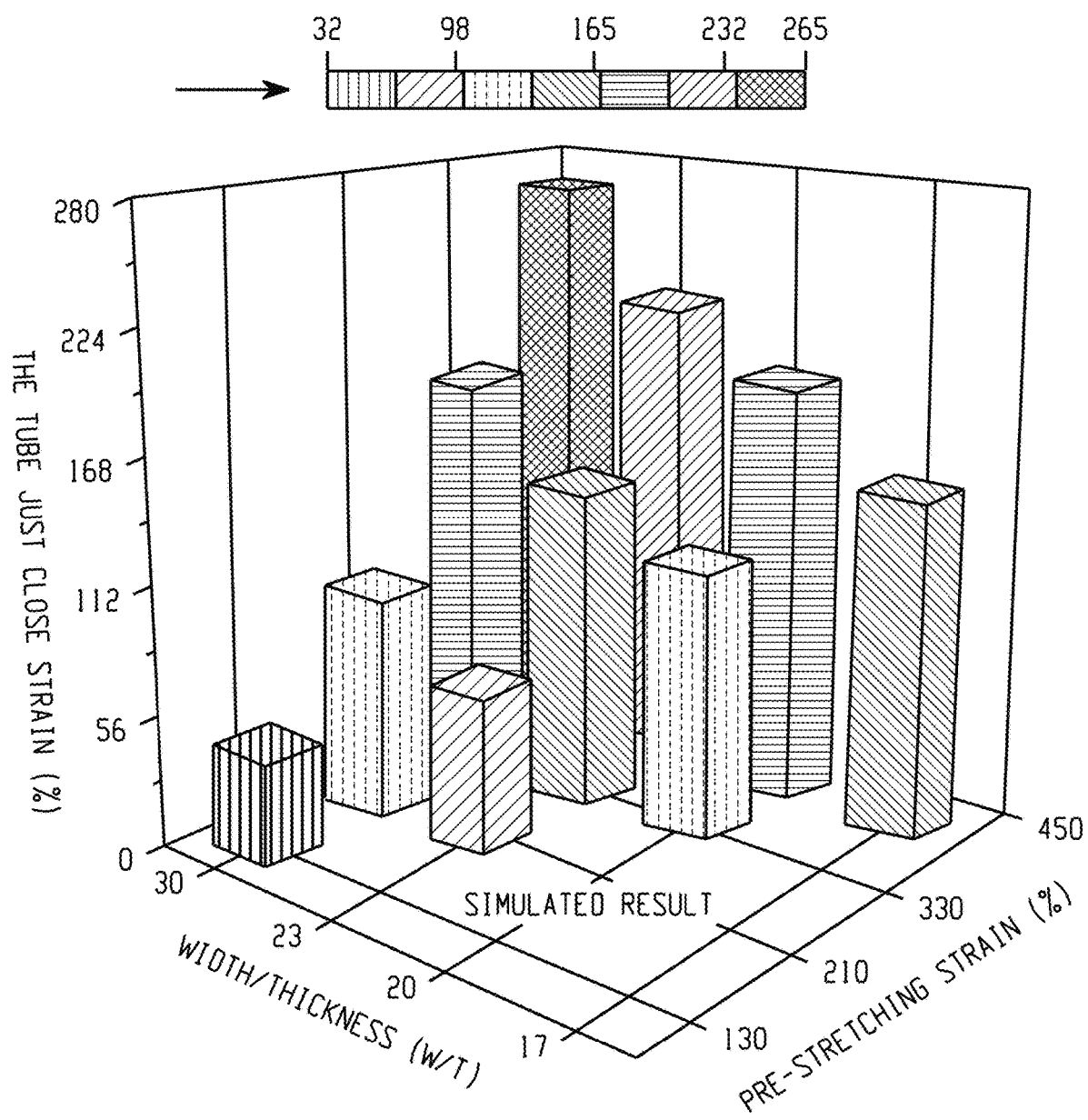
FIG. 3 illustrates the wrinkle-driven tubular structure simulated result of the tube just close releasing strain under different width/thickness ratio and pre-stretching strains.
Figure 4:
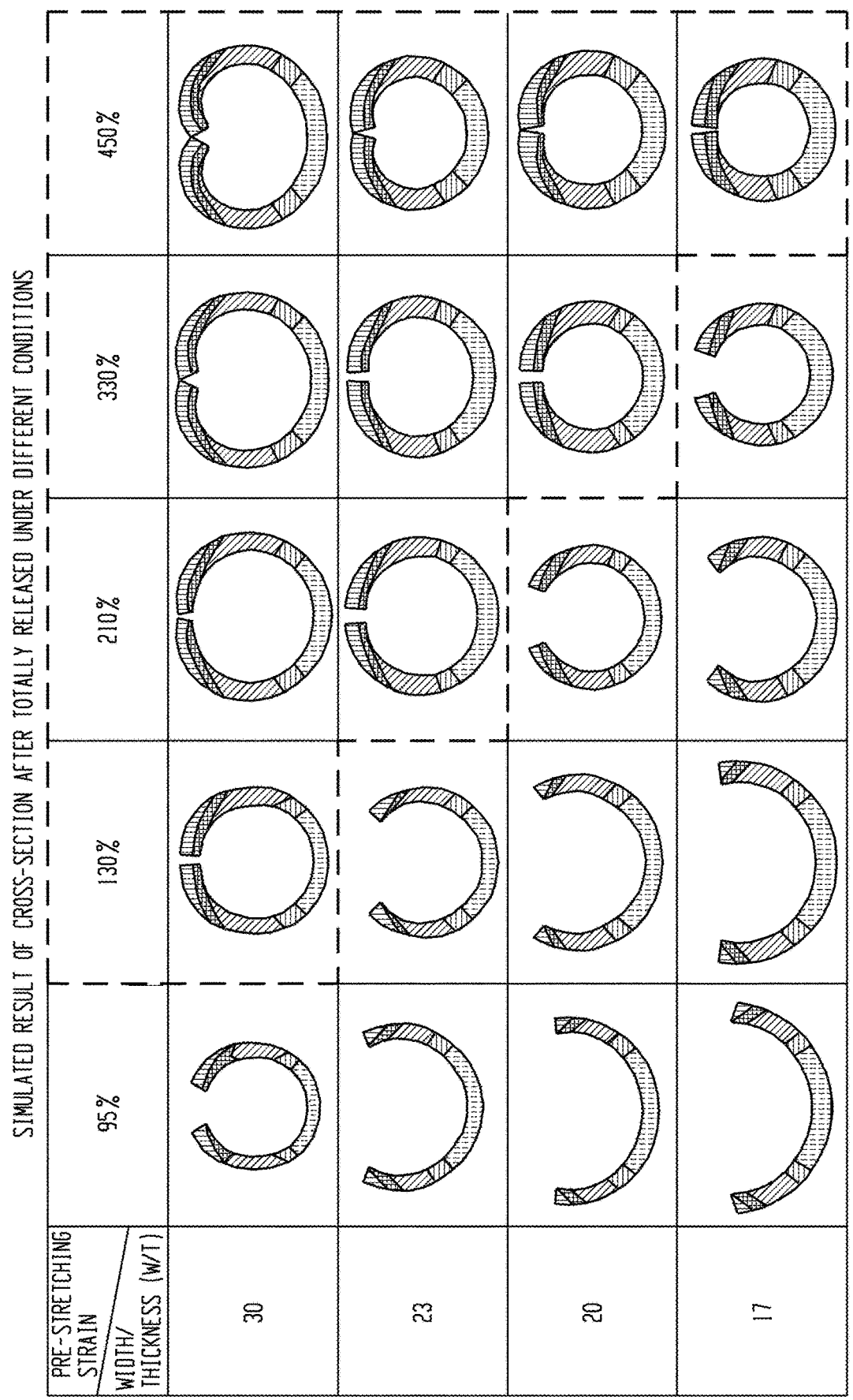
FIG. 4 illustrates the simulated results of the tube cross-section after totally released under different width/thickness ratio and pre-stretching strains.
Figure 5:
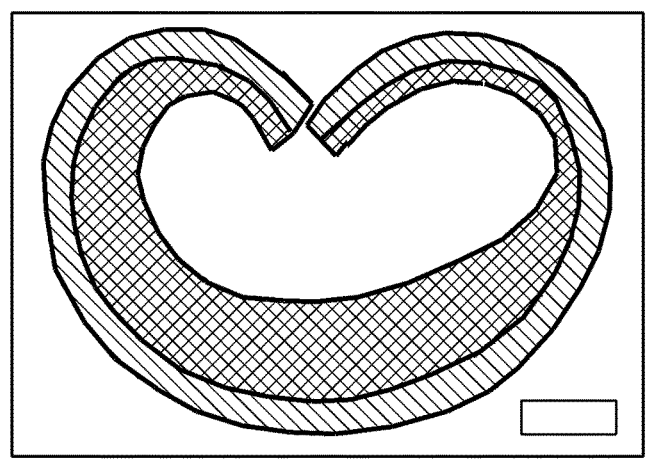
FIG. 5 illustrates the experimental result of the tube cross-section after totally released under different width/thickness ratio and pre-stretching strains (scale bar=0.6 mm).
Figure 5:
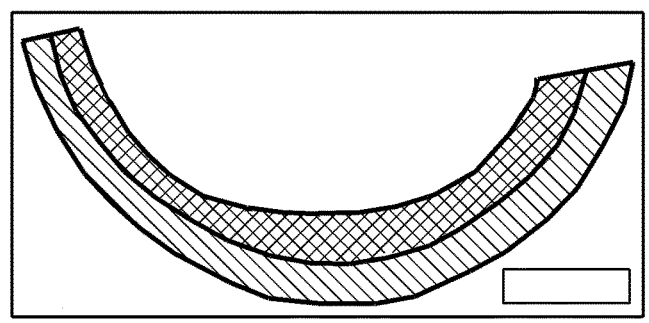

As shown in FIG. 1B, the FE simulation captures a similar circular cross-section shape after totally released under the same W/T of 20 and the pre-stretching strain of 450%. FIG. 3 shows the FE result of the releasing strain to achieve the tube just close stage, which is proportional to the W/T value and pre-stretching ratio. It reveals that a 190% releasing strain is needed to make the tube just close under the condition of W/T=20 and pre-stretching 450% strain, and it is consistent the experimental result (183% strain was needed to make the tube just close). The simulated result of final cross-section shape after totally released under different W/T ratio and pre-stretching strain is shown in FIG. 4. It's evident that these two factors play roles in final shape of the bilayer structure. Also, FIG. 4 can act as a phase diagram to provide guidance to properly select W/T ratio and pre-stretching strain to form a tubular/curved structure. For example, if a W/T=17 and a pre-stretching strain=95% is selected, an open curved structure will be obtained after rather than a closed tube as totally released. And if a W/T=30 and a pre-stretching strain=450% is selected, a close tubular structure with a heart-shape cross-section will be achieved. The corresponding experimental result for aforementioned two conditions is shown FIG. 5, which was consistent with the simulated result. (Note: two Ecoflex® layers are intentionally generated to show the curve direction (the PVA layer is atop the Ecoflex® layer); in practice only one layer of Ecoflex® is needed to induce tube formation.)

Figure 6:
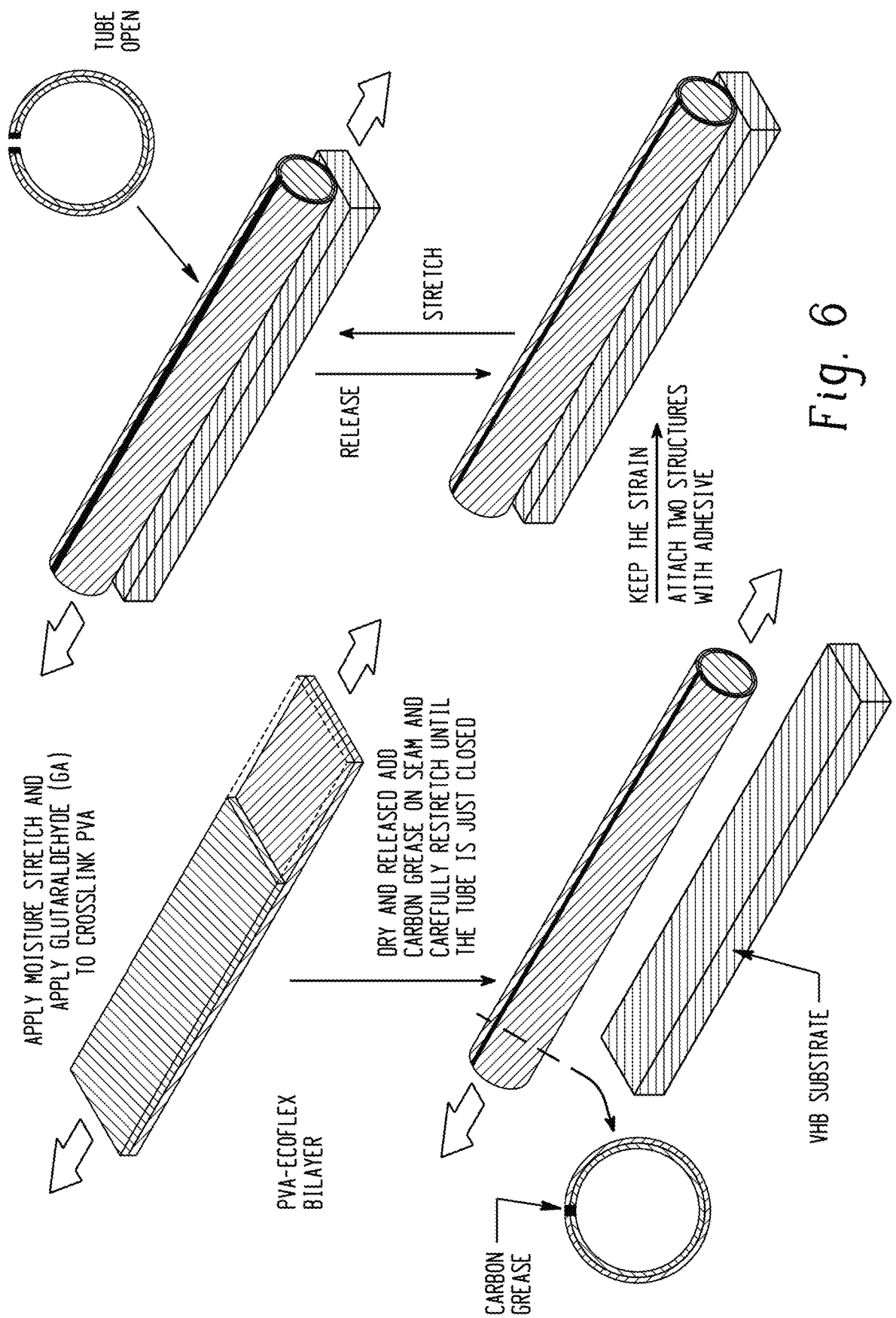
FIG. 6 illustrates the preparation schematic for the tubular strain sensor.
Figure 7:
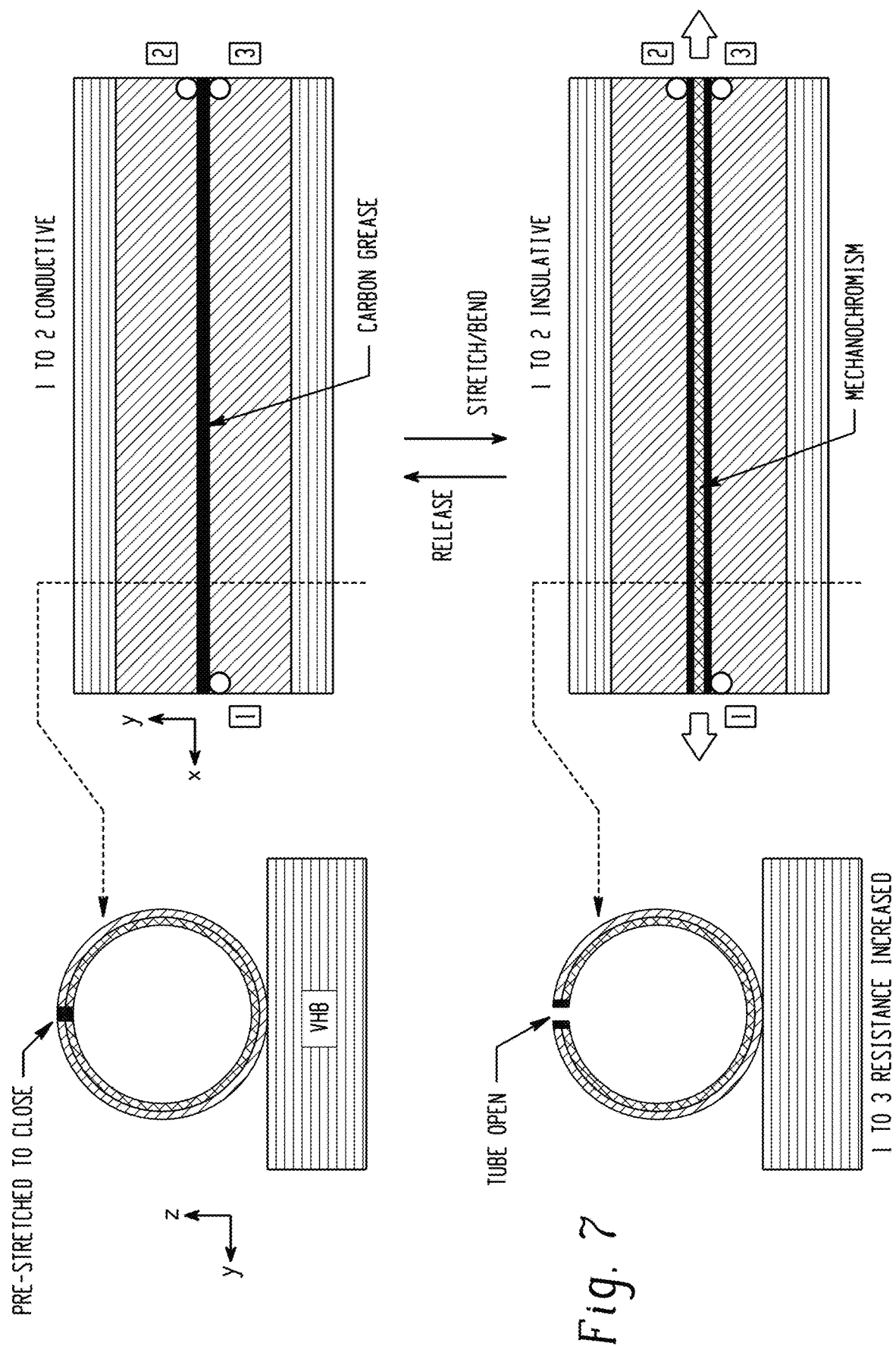
FIG. 7 illustrates the stimuli responsive behaviors of the dual-level tubular strain sensor; the schematic of tubular strain sensor demonstrating dual-level piezoresistive sensitivity from 1 to 2 and 1 to 3 resistance measuring point.
Figure 8:
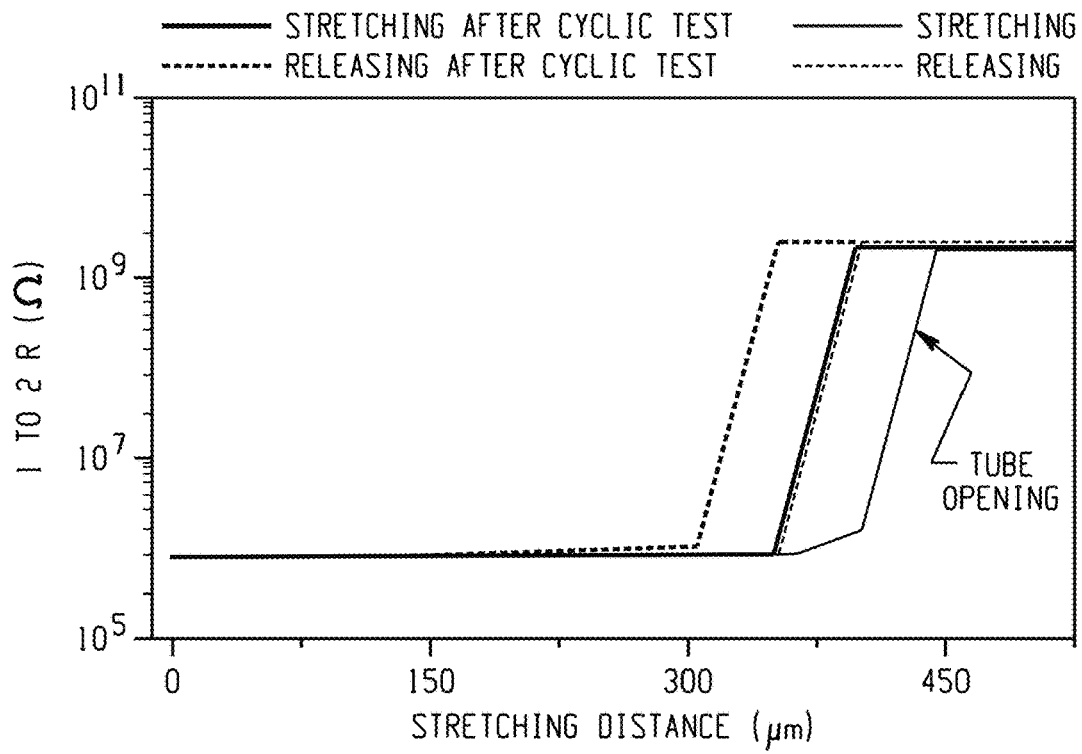
FIG. 8 illustrates the stimuli responsive behaviors of the dual-level tubular strain sensor; the ultra-high dynamic piezoresistive sensitivity of 1 to 2 resistance and the performance after cyclic test (stretching/releasing speed=0.1 mm/s; stretching and releasing between 0 μm to 500 μm for 1000 cycles).
Figure 9:
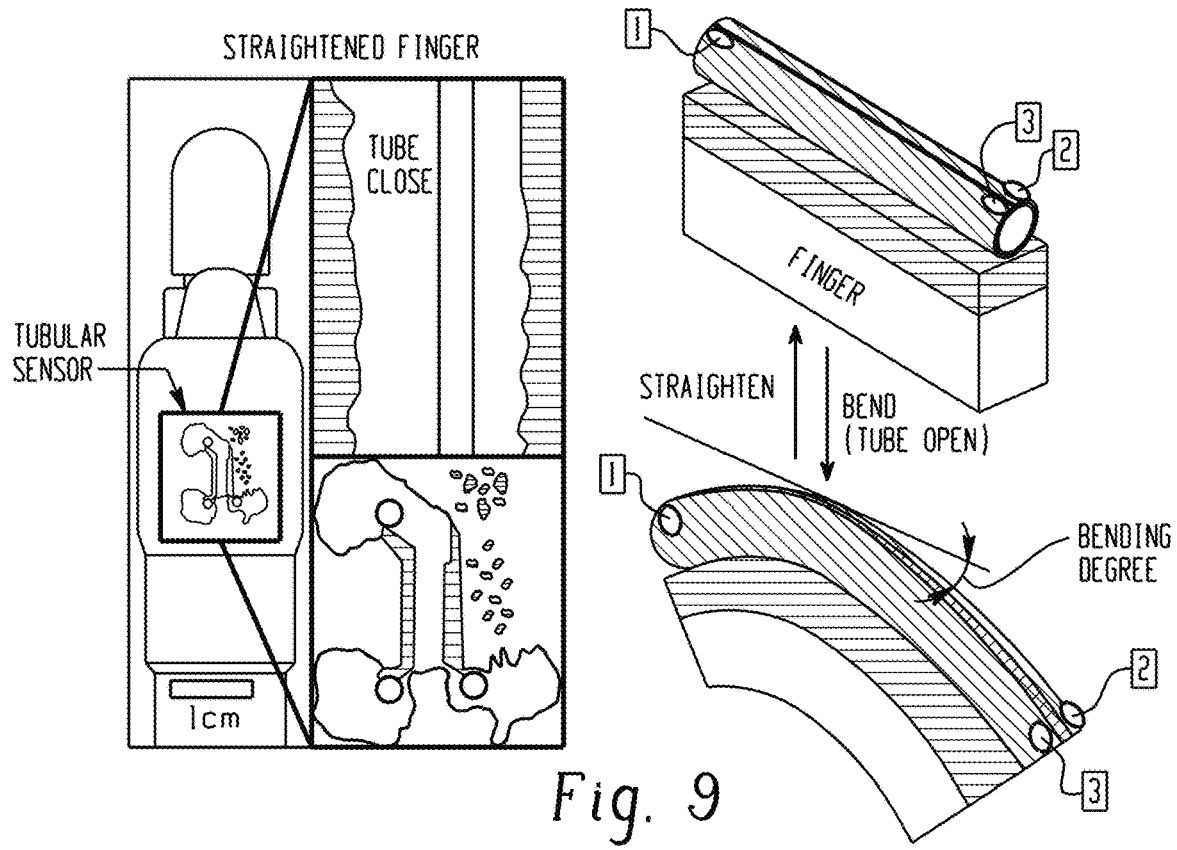
FIG. 9 illustrates the stimuli responsive behaviors of the dual-level tubular strain sensor; the set-up of tubular sensor applying for finger motion sensing (the right digital photo showing the tube close as finger straightened and the locations of the resistance measuring points of 1, 2 and 3).
Figure 10:
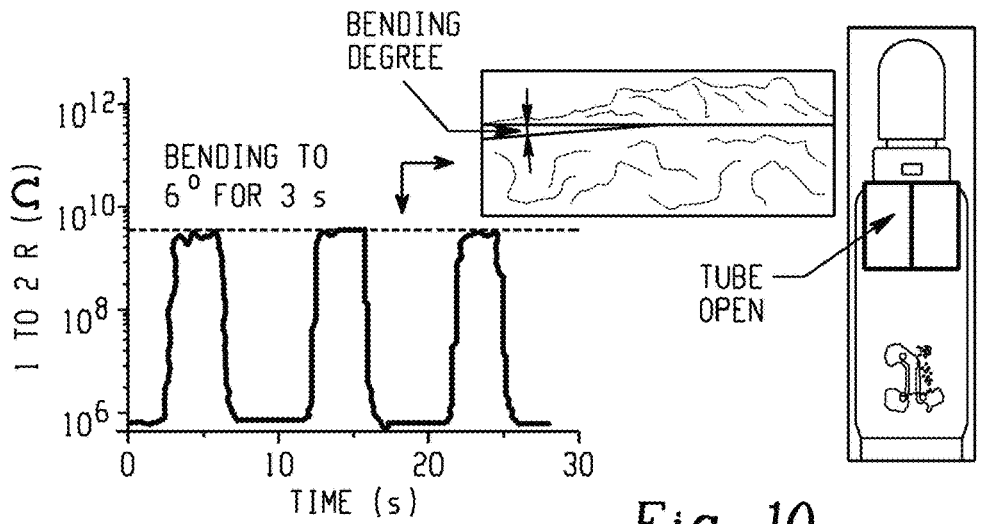
FIG. 10 illustrates the stimuli responsive behaviors of the dual-level tubular strain sensor; the piezoresistive performance of 1 to 2 as finger bent to 6° for 3 seconds and then return.
Figure 11:
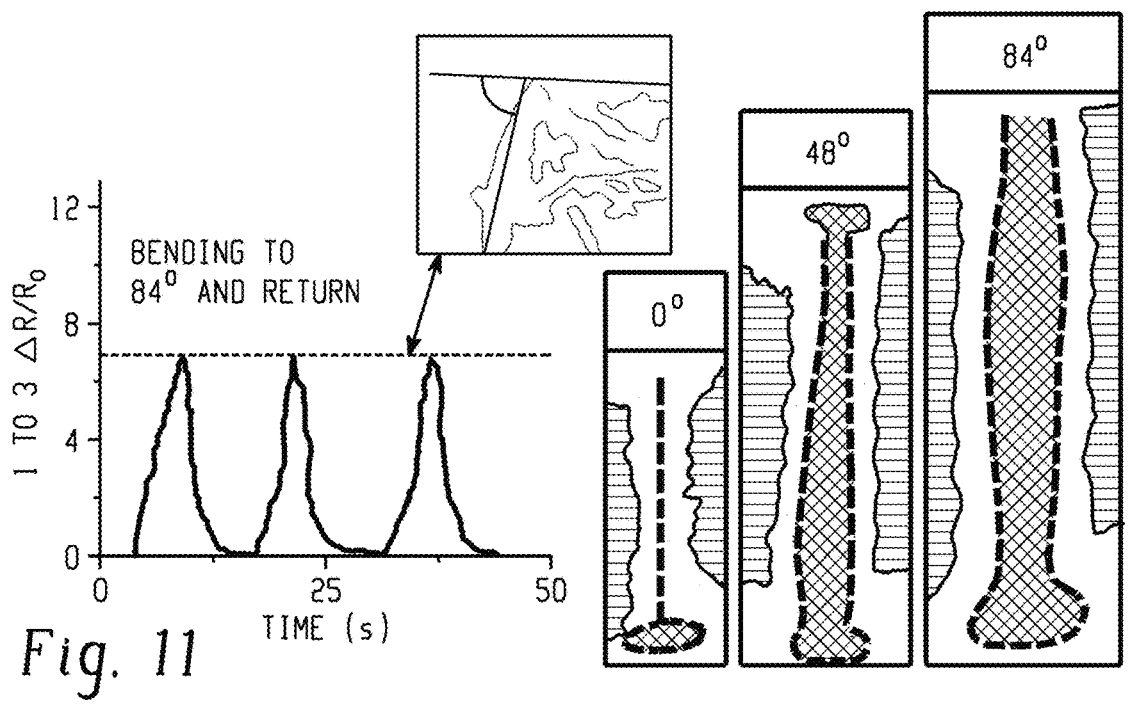
FIG. 11 illustrates the stimuli responsive behaviors of the dual-level tubular strain sensor; the piezoresistive performance of 1 to 3 as finger bent from 0° to 84° concomitant with mechanochromic effect due to tube opening (scale bar=1 mm).
Figure 12:
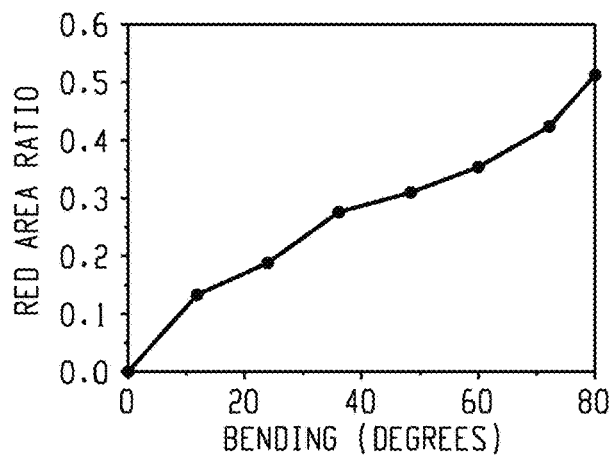
FIG. 12 illustrates the stimuli responsive behavior of the dual-level tubular strain sensor measuring the mechanochromic effect due to the tube opening as a function of finger bending at different degrees (0, 12, 24, 36, 48, 60, 72, and 84 degrees), the inner color of the tube is red, and the outer color is green, the red area ratio to the total device top view area obtained from digital photos as a function of bending degrees.

The intriguing characteristic of the longitudinal releasing (x–) strain driven angular opening/closing of tube at the y-z plane inspired us to invent a tubular strain sensor with dual-level piezoresistive sensitivity coupled with mechanochromic effect. To make the device, the PVA-Ecoflex bilayer was pre-stretched to 170% strain followed by crosslinking the PVA surface with glutaraldehyde (GA) prior to totally released to form tube and coated with carbon grease electrode. (See FIG. 6 for detail preparation steps). The cross-linked PVA holds higher humidity stability and significantly less stress relaxation than its non-crosslinked counterpart and thus it can retain outstanding 3D dimensional stability for the tubular structure under the stretching/releasing circles. Three resistance (R) measuring points (1, 2 and 3) were identified as shown in FIG. 7, the released tube was carefully re-stretched to the tube just close stage that further small stretching distance (<500 μm) can make the resistance between 1 and 2 dramatically increase to be non-conductive (R~$10^9 \Omega$) due to the opening of tube. The stretched tube was then attached to a thick VHB substrate via applying silicone adhesive to lock at this stretching level. Thus, stretching the resulting device at x direction imparted the dramatic increase of the R of 1 to 2 from $0.69\times10^6 \Omega$ to $3.29\times10^9 \Omega$ over a ultra-small distance (300 μm<d<450 μm) due to angular tube opening at y-z plane (see FIG. 8 with good cyclic test result). While the R of 1 to 3 increased linearly over a much larger sensing distance/strain (gauge factor: 9.1±0.6, sensing range: 0 to 80% strain with good reversibility, as evidenced by results of a cyclic test where the sample has been stretched/released from 0% to 80% strain for 1000 times) coupled with a mechanochromic effect due to the exposure of red inner surface (see FIG. 7 horizontal open gap in lower right structure at "MECHANOCHROMISM") as the tube continuously open, and the red area expanded proportional to the stretching distance at x direction (the tube opening width as a function of stretching distance for the tubular strain sensor). This tubular piezoresistive sensor can be applied to the joint of finger for sensing the bending motion (dummy finger is used as demonstration, see FIG. 9), the tube was close as finger straightened while a ultra-small bending of 6° drastically increased the R of 1 to 2 from $0.7\times10^6 \Omega$ to $10^9 \Omega$ as the tube open (see FIG. 10). When the finger bent for a larger degree range from 0° to 84°, the R of 1 to 3 increased linearly by 6.7 folds, coupled with the correlated mechanochromic effect, which the area ratio of internal red surface increased to 0.51 (see FIG. 11 and FIG. 12).

Figure 13:
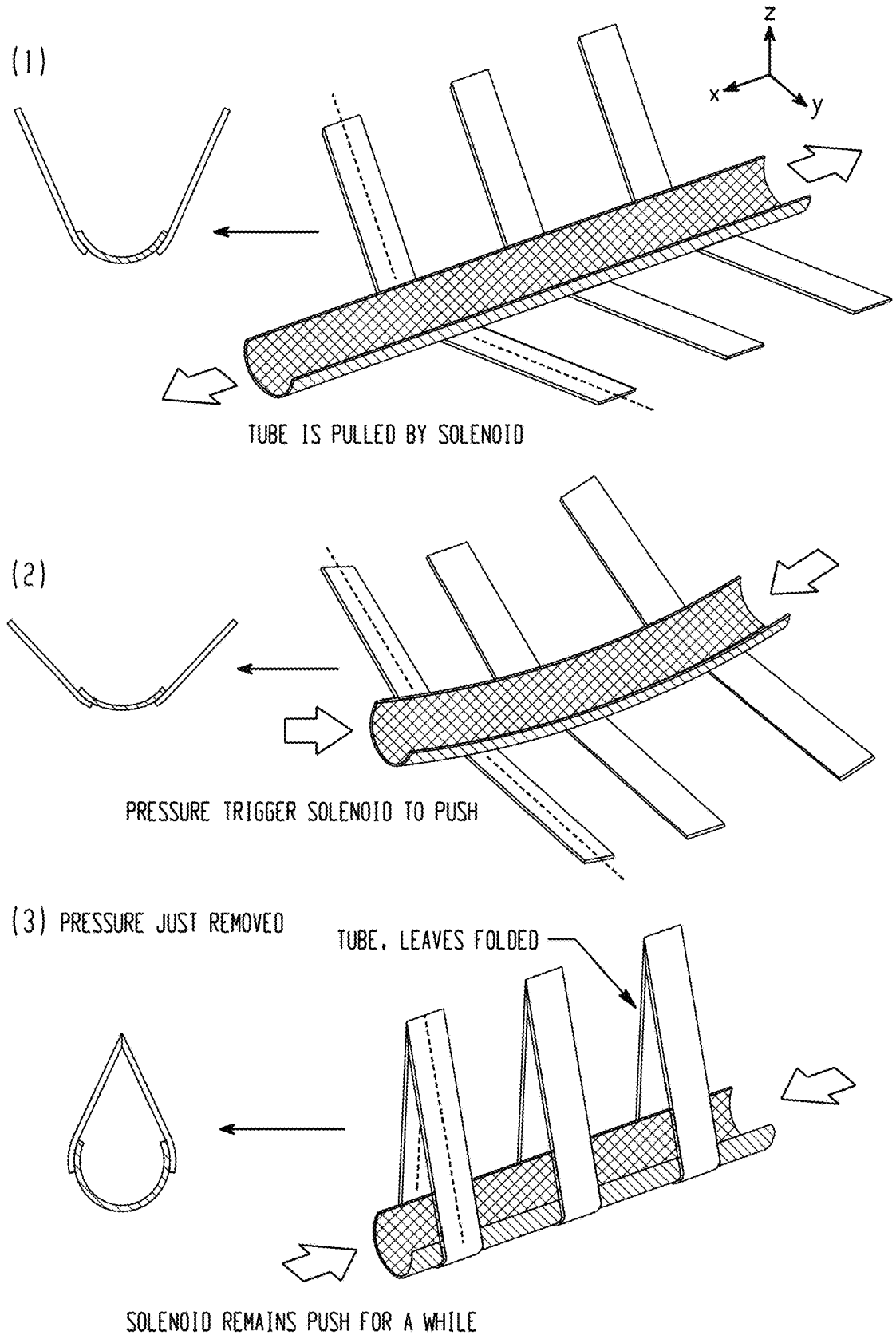
FIG. 13 illustrates the general design strategy of artificial mimosa.
Figure 14:
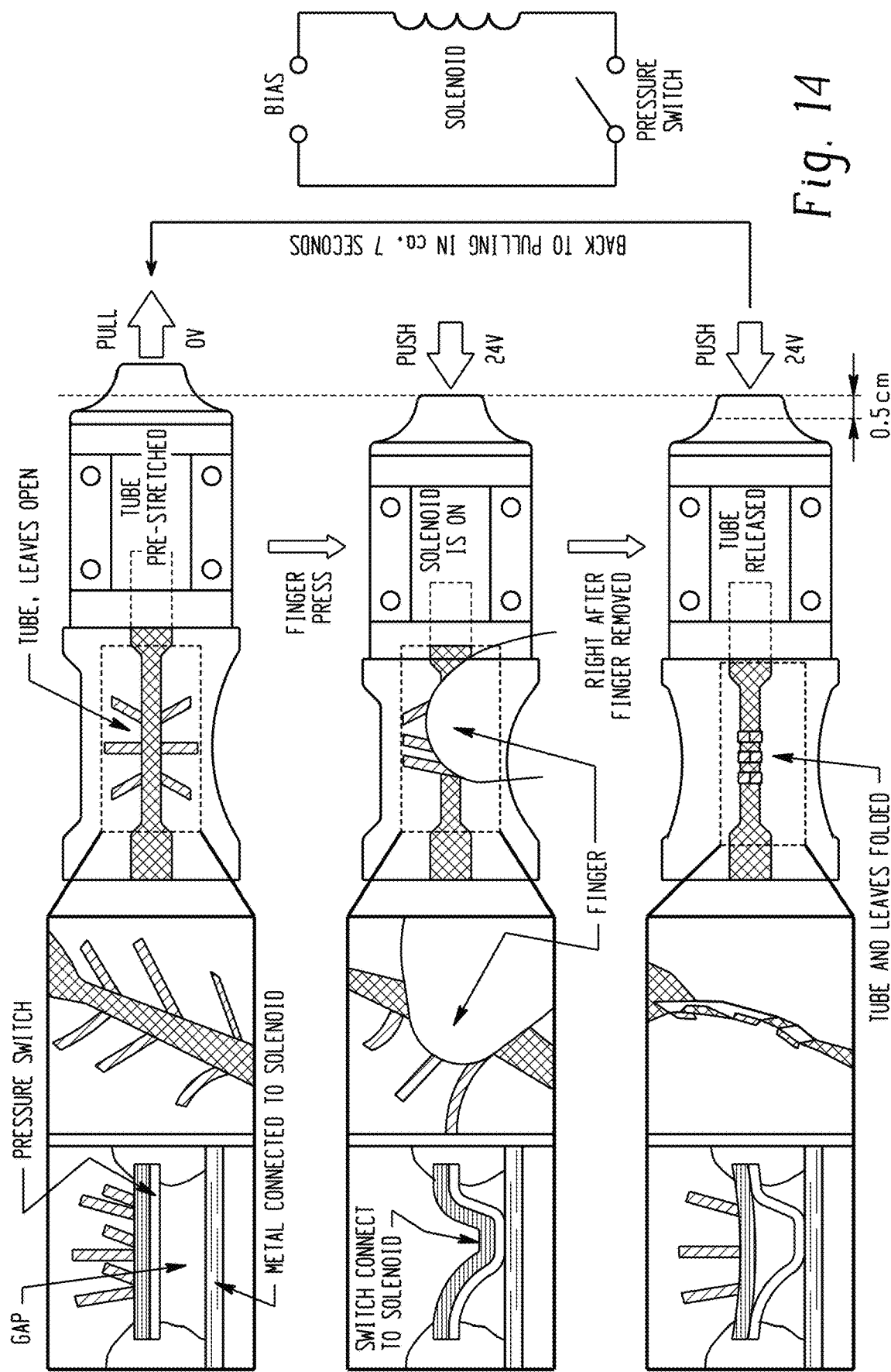
FIG. 14 illustrates the tactile responsive behavior of artificial mimosa device based on a tubular geometry with plastic leaves attached both sides on a slider with pressure switch connected to power.

This strain driven angular tube opening/releasing response was further used to develop an artificial mimosa, mimicking the tactile responsive leaves folding characteristic of the plant *Mimosa*. As shown in FIG. 13 and FIG. 14, the tubular structure with leaves attached on both sides was pulled to a pre-stretched state by a push-pull style solenoid, which was at a pull state as it was off. While it can be at a push state when connected to 24V DC bias. Thus, when the solenoid was off, the pre-stretched state allowed the tube and leaves to be open. To achieve tactile responsive leaves folding motion like *Mimosa*, a stretchable pressure switch made by attaching the conductive thread (the thread is connected to a power bias=24V) on the VHB substrate was placed right under the tube (see FIG. 14 and FIG. 15 for working mechanism). The stretchable pressure switch was prepared by stretching the VHB tape, attaching a conductive thread down the center of the stretched tape longitudinally, and releasing the stretch on the VHB tape where the conductive thread obtains a serpentine shape; the pressure switch was flipped and fixed on a slider where the pressure switch was connected to power, the metal stand is connected to the solenoid and there is a gap between the metal stand and pressure switch. When sufficient tactile pressure (>11 kPa) applied on the tube part for just 0.2 s, the pressure switch can be deformed and electrically connected (resistance of the switch reduced to ~10Ω from $10^{11}$Ω under pressure larger than 11 kPa) to the solenoid and made it on to become push state. Right after the pressure removed, ascribing to the slow shape recover rate of VHB, the pressure switch remained connected to solenoid for ca. 7 second prior to pressure switch disconnected due to shape recover and the solenoid back to pull state. Thus, the tube was pushed by the solenoid in a released distance of 0.5 cm (see FIG. 14) with leaves folded for 7 second prior to return to the pulled state with leaves open back. The time evolution of the tactile pressure, resistance of the pressure switch, the corresponding tube's curvature angle and cyclic test are shown in FIGS. 16A, 16B, 16C, and FIG. 17. This sensitive artificial tactile responsive device has a high resemblance to its nature counterpart, *Mimosa pudica*, via using this unique 3D reconfigurable mechanics of the tubular geometry.

Figure 18:
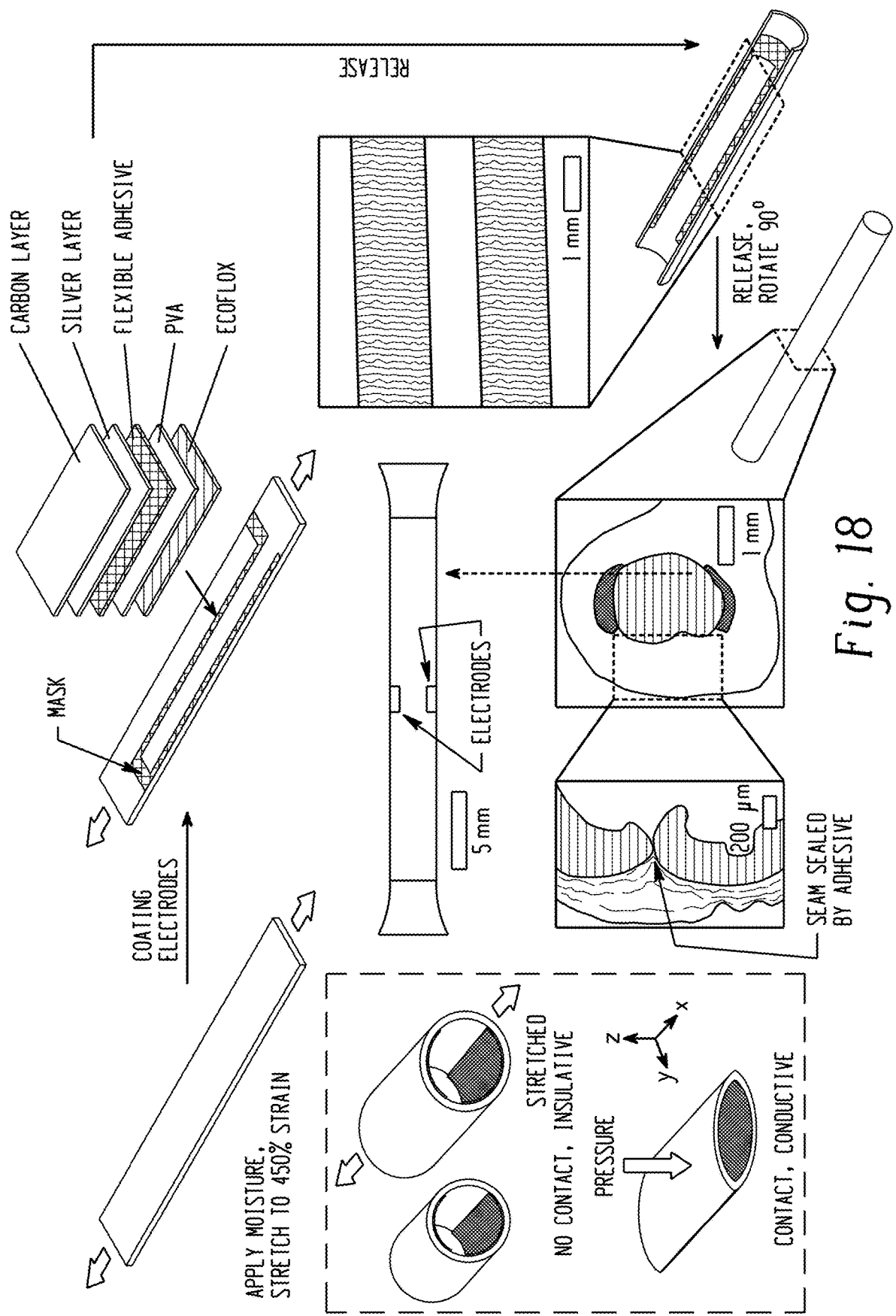
FIG. 18 illustrates the fabrication schematic of the 3D tubular tactile switch by the "coated and wrapped" method with real sample's side-view, cross-section and wrinkled morphology images.
Figure 19:
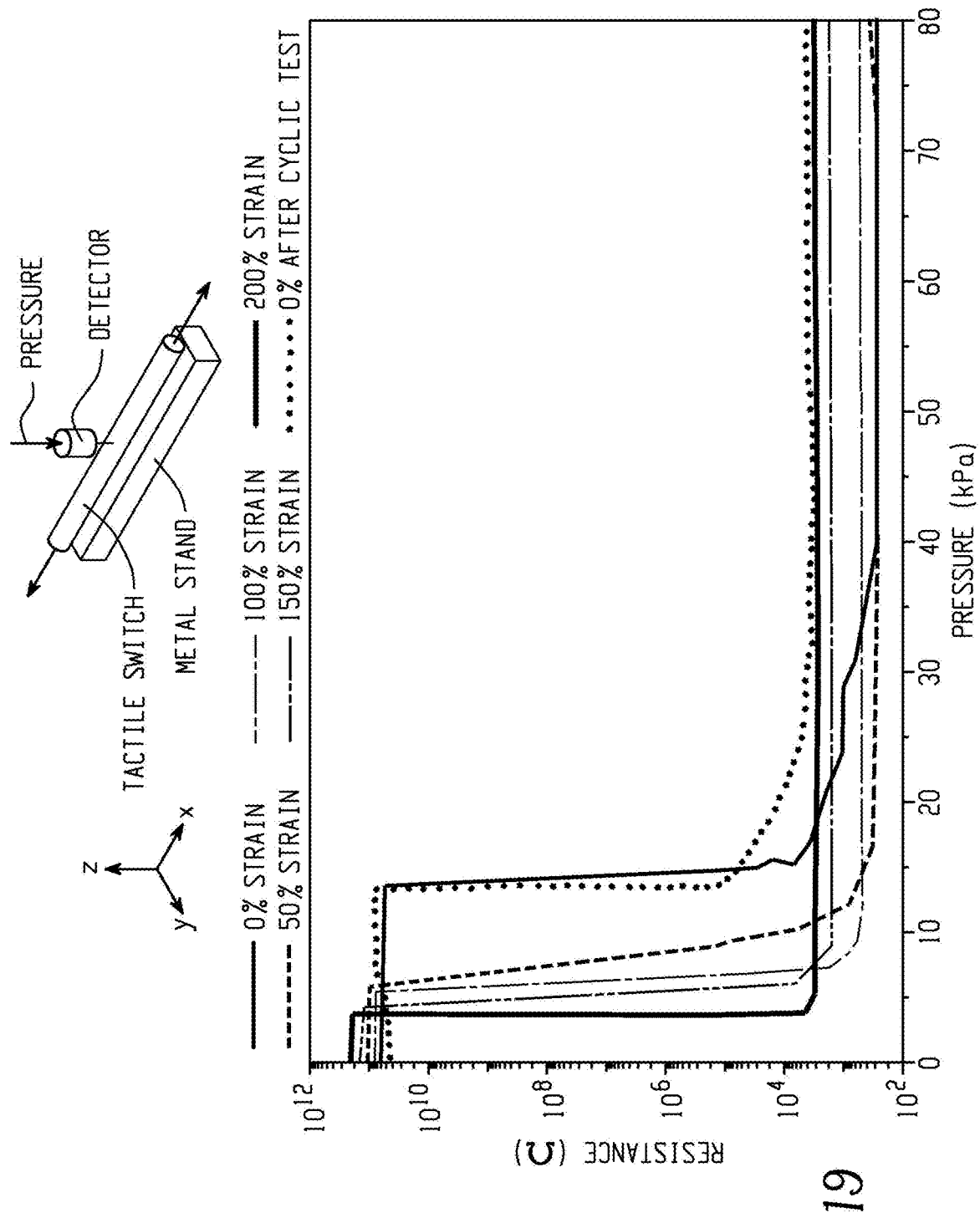
FIG. 19 The schematic for characterizing the tactile switch response under pressure from z direction and various stretching strain at x direction and the corresponding testing result.
Figure 20:
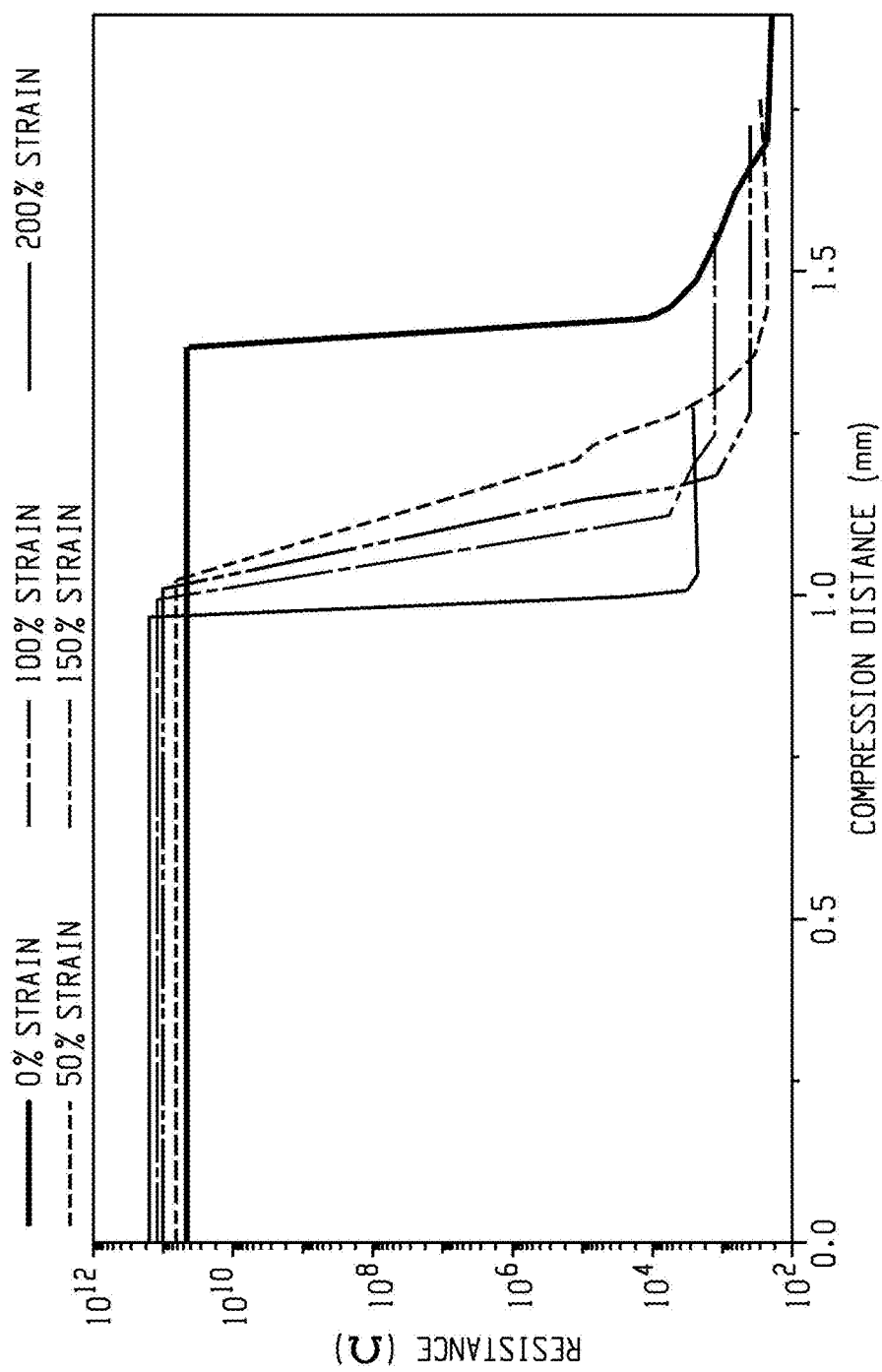
FIG. 20 The resistance of tactile switch as a function of compression distance at z direction under various stretching strain at x direction.
Figure 21:
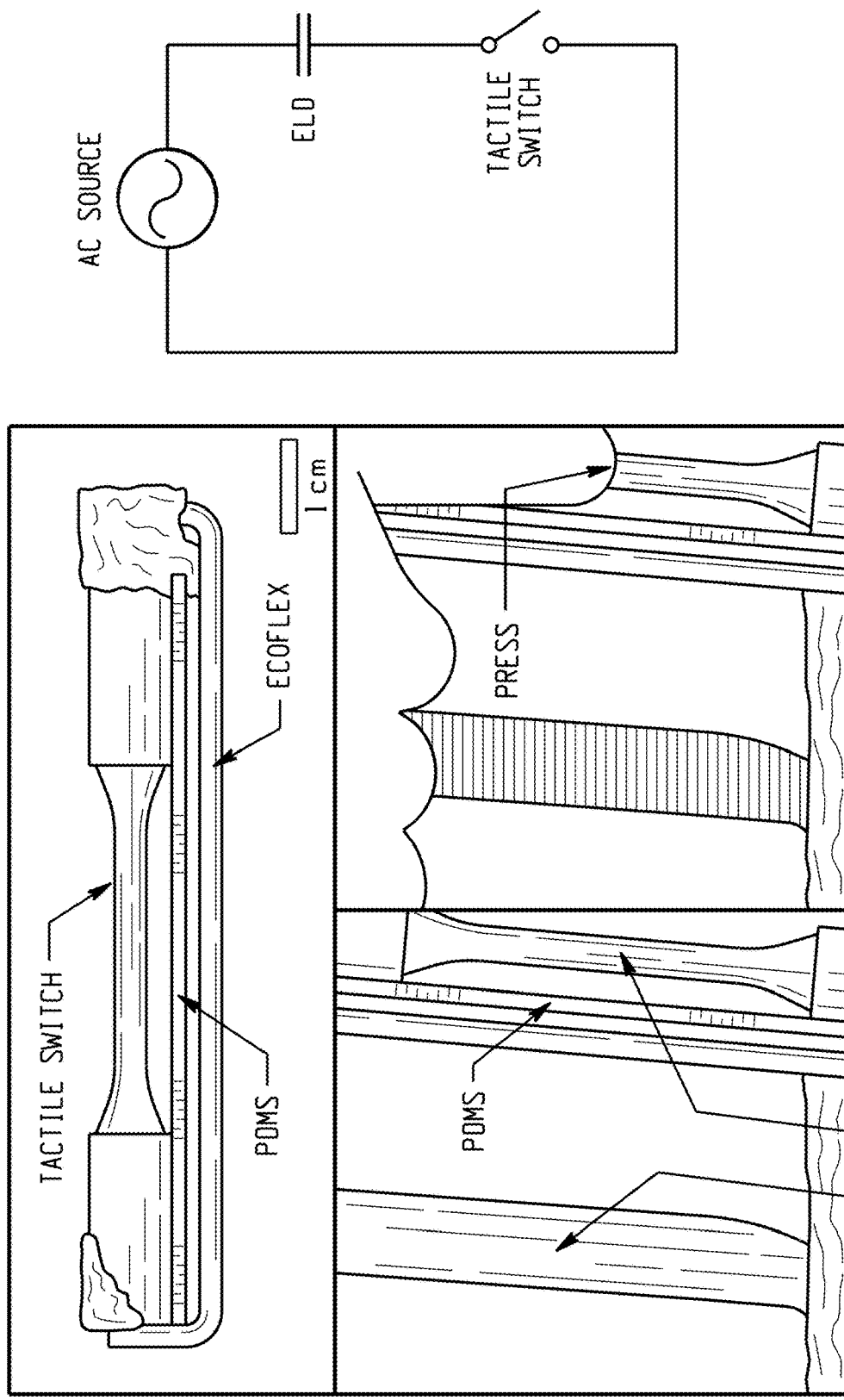
FIG. 21 illustrates the performance and the circuit layout of the tactile switch applied for wearable tactile responsive electroluminescent device.

Since this 3D tubular structure is fabricated from the 2D precursor, it is highly compatible with the modern 2D film deposition techniques. Thus, customized patterns of electrodes can be coated on the 2D precursor followed by releasing and wrapping the patterned and wrinkled electrodes to the inner surface of the 3D tubular structure. Upon sealing the seam with stretchable adhesive, this unique tubular structure can be retained as stretched and the wrinkled electrodes can maintain fractures-free structures and high conductivity within the stretching limit. Thus, it's viable to use this facile "coated and wrapped" technique to fabricate series of 3D stretchable tubular electronics with unprecedented functionalities. As shown in FIG. 18, a flat PVA-Ecoflex® bilayer was pre-stretched with the moisture plasticizing method to 450% strain. A stencil mask was then applied on the dried PVA surface followed by spray coating of flexible adhesive, carbon and silver electrodes. Two separated and opposing electrodes was obtained as mask released. As the substrate released, the originally 2D planar geometry was curved into 3D wrinkled tubular structure followed by the seam sealed with adhesive and then rotate 90 degree around the x axis (see the cross-section image in FIG. 18, and the two electrodes mainly align on x-y plane). The resulting tubular structure serves as a 3D soft supporting scaffold allowing the two wrinkled electrodes to retain disconnected as stretched only at x direction and each individual electrode can be stretched up to 200% strain at x direction without apparent conductivity deterioration (as evidenced by the resistance of one silver and carbon electrode for the tactile switch as a function of strain and the performance after cyclic test (stretching/releasing from 0% to 100% strain for 1000 times was conducted for cyclic test). Moreover, due to the distinct shape adaptivity of this tubular geometry, a compression at through-thickness (z) direction can readily deform the circular shaped cross-section at y-z plane and make the two wrinkled electrodes contacted. And this response is independent from the stretching/releasing at x direction. Thus, an intriguing highly stretchable tactile switch can be invented from this design. As shown in FIG. 19 and FIG. 20, the switch initially was non-conductive either at released state or at 200% strain (R~$10^{11}$Ω) and applying a tactile pressure at the threshold value ($P_t$) at z direction endowed the switch to instantaneously become conductive (R~$10^5$Ω) with a small compressing distance ($P_t$=14.5 kPa at 0% strain with compressing distance of 1.4 mm and $P_t$=3 kPa for at 200% strain with compressing distance of 0.94 mm). And further increase tactile pressure can significantly reduce the resistance (Such as, the R=292Ω at 0% strain and the R=2930Ω at 200% strain, as under 44 kPa pressure) followed by becoming level off with increasing pressure. After cyclic compressing/releasing test, the tactile switch can still maintain the good tactile switch response (see FIG. 19). Herein, this 3D tactile switch is insensitive to stretching strain at x direction but of high tactile sensitivity at z direction with good reversibility. This 3D tactile switch can be applied on a wearable tactile responsive electroluminescence device. As shown in FIG. 21, the tactile switch (top image) is worn on human arm at a strain of 42% and the electroluminescence can be activated upon tactile pressing, shown here by a finger press (the lower left view shows the electroluminescent device off, and the lower right view shows the electroluminescent device "on" with luminescence illustrate as horizontal lines).

Figure 22:
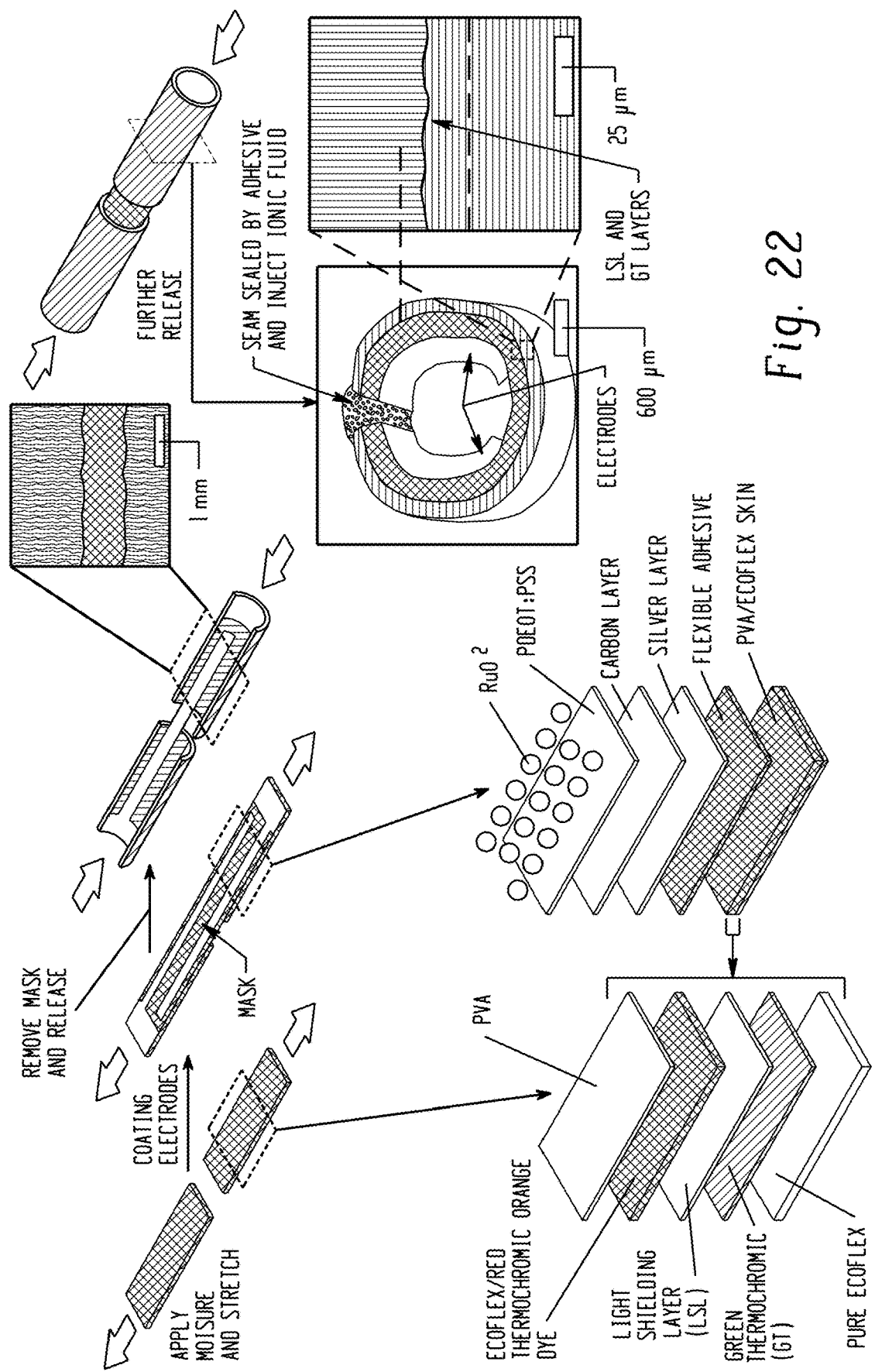
FIG. 22 illustrates a fabrication schematic of dual stimuli responsive tubular supercapacitor with real sample's cross-section and wrinkled morphology images.
Figure 23:
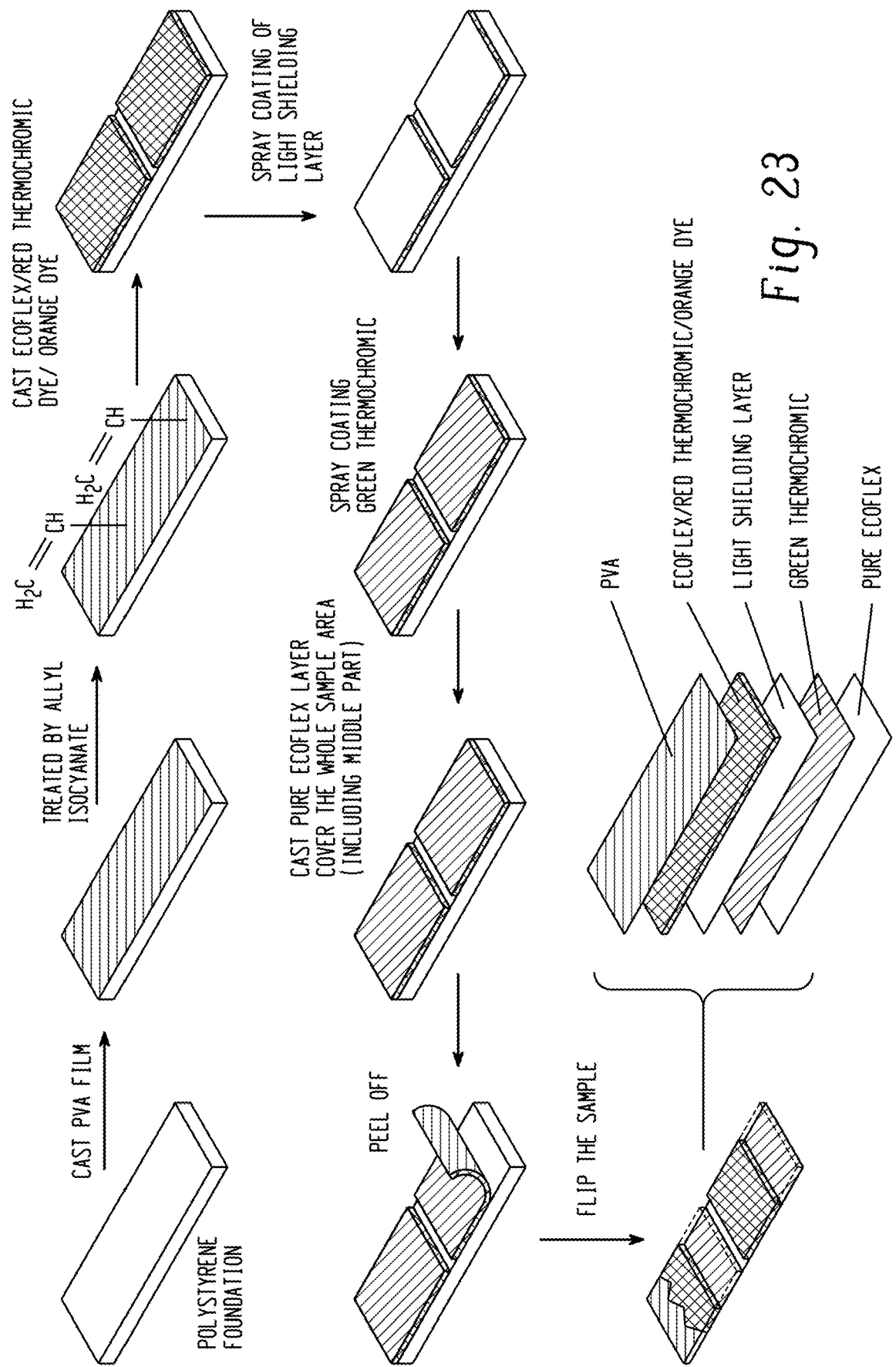
FIG. 23. illustrates the preparation schematic of PVA-Ecoflex® film-substrate system with dual responsive chromic skin as building block for the tubular supercapacitor.
Figure 24:
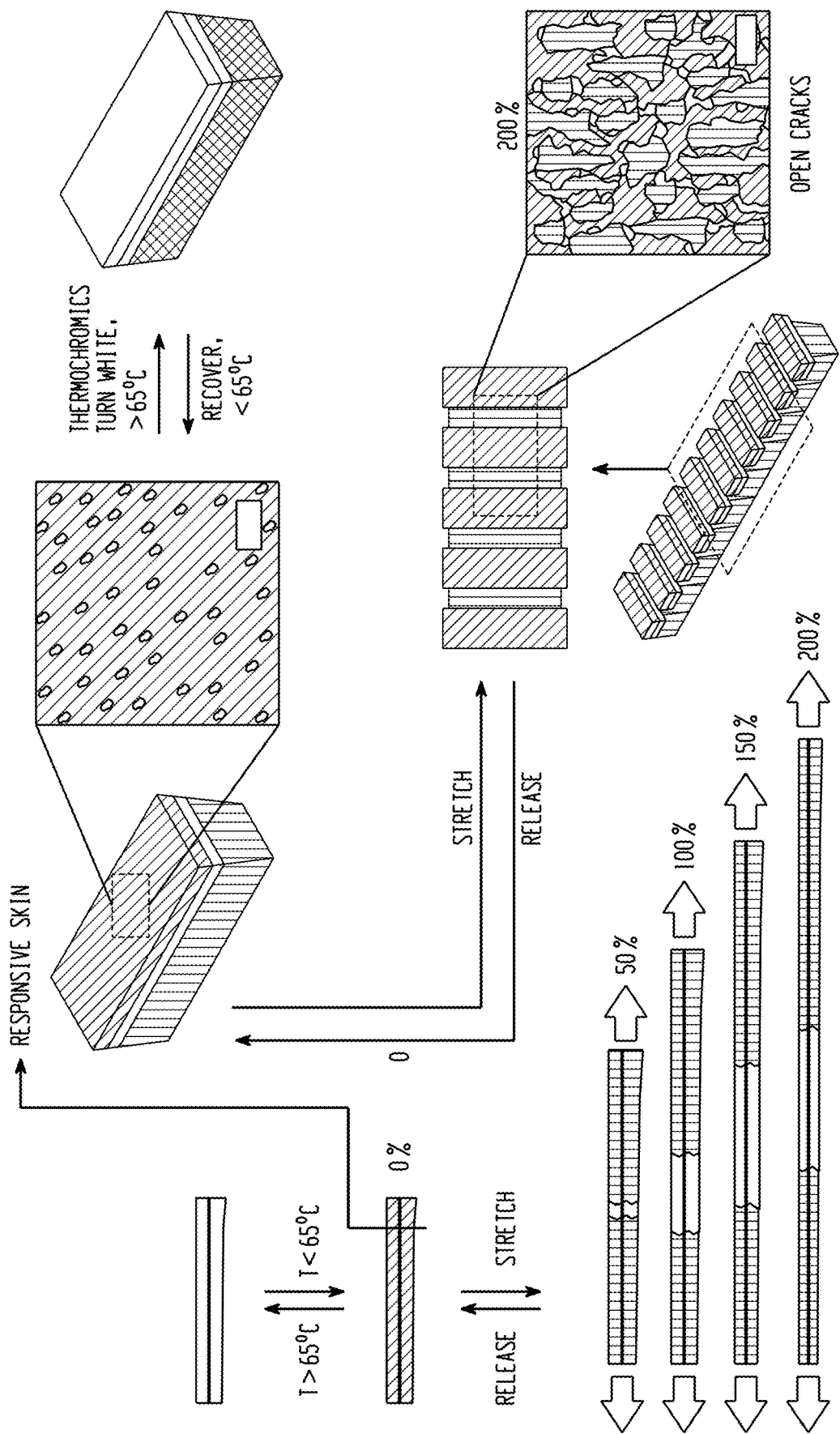
FIG. 24 illustrates the performance of the thermo, mechanochromic behaviors of the dual stimuli responsive tubular supercapacitor (white scale bars=50 μm).
Figure 25:
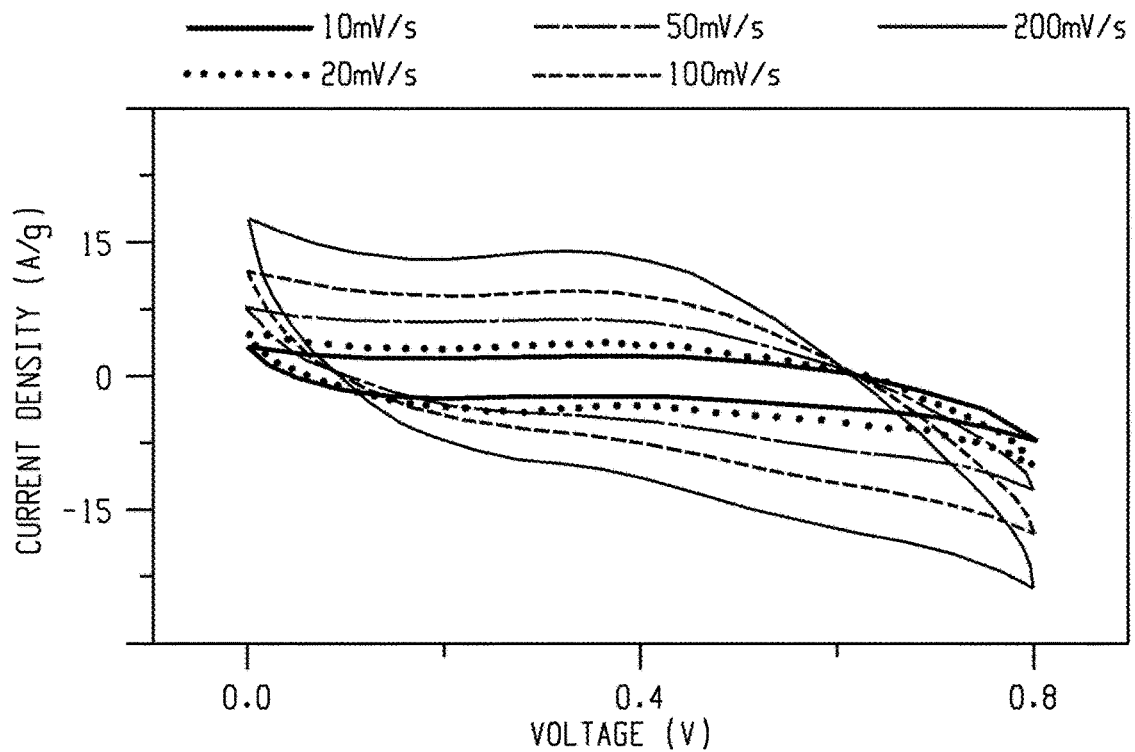
FIG. 25 illustrates the cyclic voltammetry (CV) curve of tubular supercapacitor at different scan rates of the dual stimuli responsive tubular supercapacitor.
Figure 26:
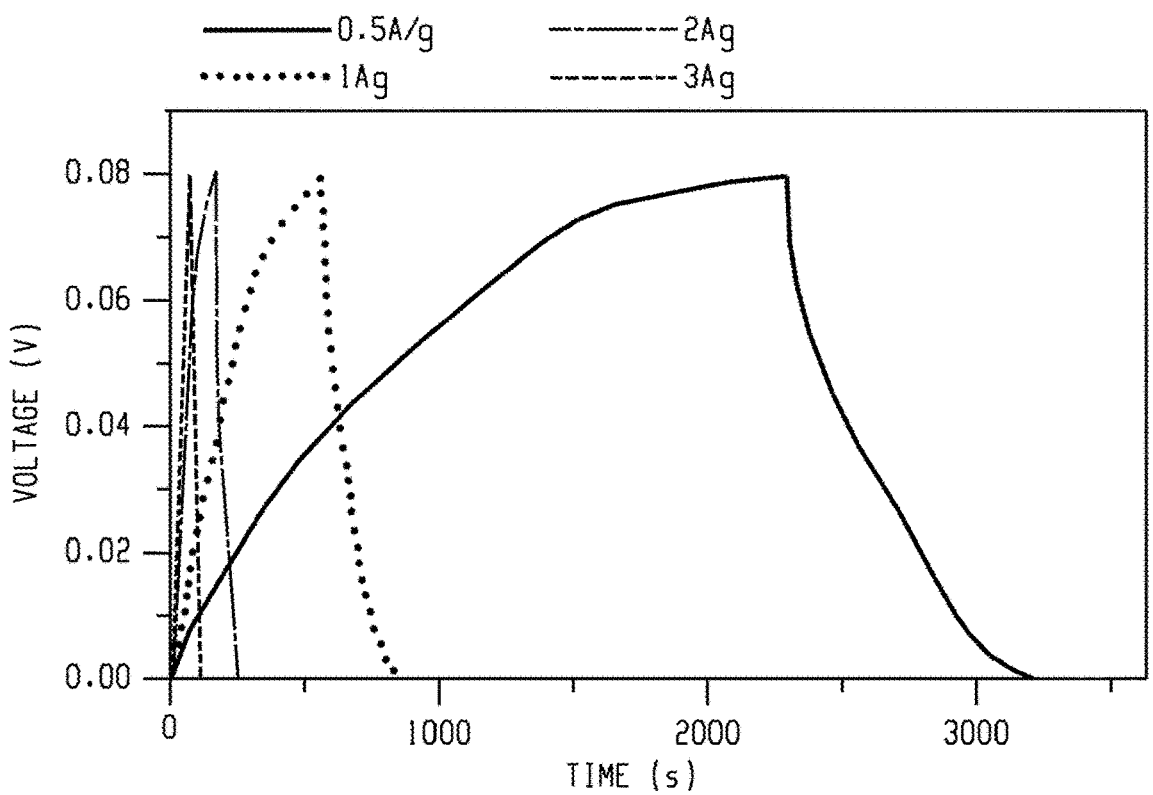
FIG. 26 illustrates the galvanostatic charge-discharge curves of tubular supercapacitor at various current densities at 0% strain of the dual stimuli responsive tubular supercapacitor.
Figure 27:
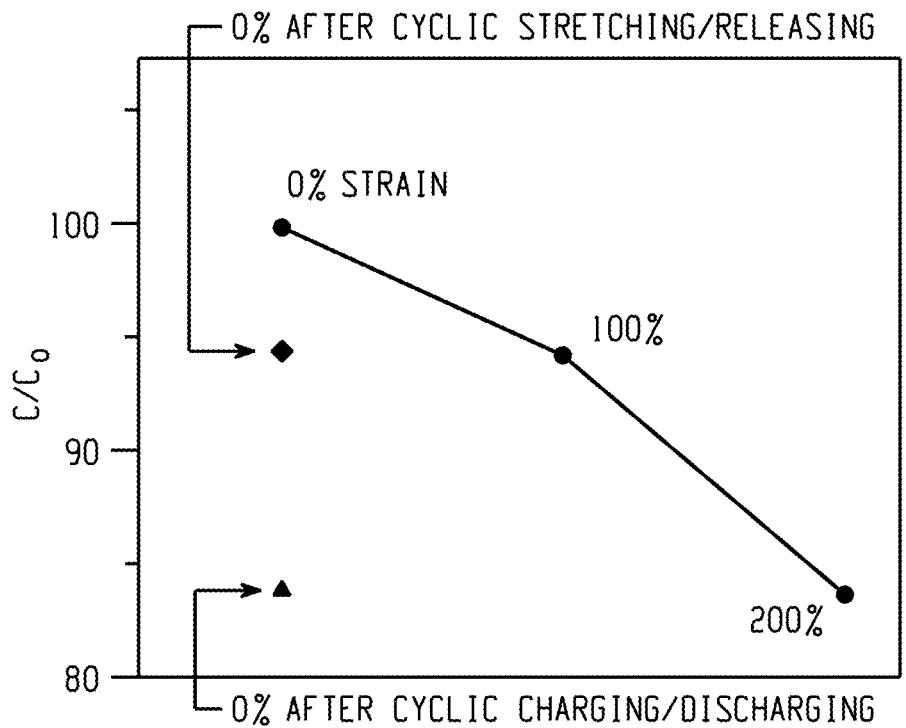
FIG. 27 illustrates the capacitance variation for tubular capacitor with various stretching strain, at 0% strain after 1000 stretching/releasing cycles from 0% strain to 100% strain and at 0% strain after cyclic charging/discharging for 2000 cycles at 5 A/g of the dual stimuli responsive tubular supercapacitor.

This 3D tubular geometry with two opposing electrodes can be further applied as a robust scaffold for supercapacitor application. The external Ecoflex® skin of the tube was developed into a dual responsive chromic skin, which can switch color from green to red as stretched from 0% to 200% strain at temperature (T)<65° C. and switch to light orange as T>65° C., acting as thermal/strain chromic sensor that critical for the performance of supercapacitor (The maximum safe operation temperature for supercapacitor is typically considered as 70° C.). As shown in FIG. 22, this chromic skin contains an Ecoflex® encapsulated green thermochromic layer outside the rigid light shielding layer attached to a Ecoflex®/red thermochromic/orange dye and PVA internal layers. FIG. 23 illustrates the preparation schematic of PVA-Ecoflex® film-substrate system with dual responsive chromic skin as building block for the tubular supercapacitor. The red thermochromic pigment exhibits a red color at temperatures less than 65° C. and a white color at temperatures greater than 65° C.; the green thermochromic pigment exhibits a green color at temperatures less than 65° C. and a white color at temperatures greater than 65° C. To fabricate the tubular supercapacitor, PEDOT:PSS and RuO$_2$ were coated as the active materials and carbon and silver layers were coated as highly conductive current collector on the 2D precursor with dual responsive chromic skin. The 2D structure was then curved into a tubular geometry as totally released with the seam sealed by the stretchable adhesive, and this tubular structure can offer liquid loading capacity. Thus, subsequently, an ionic liquid (1-ethyl-3-methylimidazolium tetrafluoroborate) was injected inside tube as electrolyte with the two ends of tube also sealed. The dual responsive chromic characteristic is shown in FIG. 24. The green thermochromic layer and light shielding layer (made by $TiO_2$/mirror chromic coating) (in the cross-section views of FIG. 24, green color is represented by the regions having diagonal lines) exhibited distributed opening cracks as stretched and endowed the exposure of the underlying red insider layer (in the cross-section views, red color is represented by the regions having vertical lines) mimicking the color change mechanism of Cephalopod. The opening cracks width and the degree of red of tube is proportional to the applied strain (crack width ranging from 0 micrometers at 0% strain to about 15 micrometers at 200% strain; the degree of red of chromic skin as a function of stretching strain at x direction ranged from 0% at 0% strain to 100% at 200% strain (the degree of red ($D_{red}$) is defined as $D_{red}=100\%*|a_{x\%}-a_{0\%}|/|a_{200\%}-a_{0\%}|$, where $a_{x\%}$, $a_{0\%}$, and $a_{200\%}$ is the a value of the La*b* color coordinate of the chromic skin at x % strain, 0% strain and 200% strain, respectively). As heating to T>65° C., both green and red thermochromic switched to white, and an overall light orange color was demonstrated due to the presence of thermal insensitive orange dye (orange color in the cross section views represented by the cross-hatch in FIG. 24). And a fading of light orange was also exhibited as stretched under T>65° C. The electrochemical properties of supercapacitor were present by the cyclic voltammetry (CV) and galvanostatic charge-discharge curve as shown in FIG. 25 and FIG. 26. The specified capacitance obtained from the CV curve was as high as 513 F/g at 10 mV/s and 574 F/g at 0.5 A/g, which was highly comparable with most of other stretchable supercapacitors, due to the high conductivity of carbon/silver current collector and excellent electrochemical storage capability of $RuO_2$. The capacitor also manifested good capacitance and electrode resistance retention over cyclic stretching/releasing and cyclic charging and discharging (see FIG. 27 and as evidenced by galvanostatic charge-discharge curves of tubular supercapacitor at different stretching strain and the corresponding performance after cyclic test (stretching/releasing the tubular supercapacitor from 0% to 100% strain for 1000 times was conducted for cyclic test), Nyquist plots of tubular supercapacitor at 0% strain before and after cyclic test (stretching/releasing the tubular supercapacitor from 0% to 100% strain for 1000 times was conducted for cyclic test), and specific capacitance retention on cycle number at a current density of 5 A/g (0-2000 cycles)).

As shown above, a 3D tubular geometry was prepared with an internal wrinkled surface and an openable seam, which is fabricated from releasing a pre-strain PVA-Ecoflex® film-substrate 2D precursor under suitable substrate width/thickness ratio and pre-stretching strain. Notably, the thin film and substrate demonstrate a "collective deformation" feature in the releasing process, in which the entire film-substrate structure contributes to the final 3D tubular geometrical shape. The presence of wrinkles during the releasing process modify the effective properties of the film, and thus make the film tends to contract longitudinally. However, the substrate experiences transverse expansion due to the Poisson's effect, resulting in bending motion of the bilayer and eventually curve into a tubular structure upon further release. This tubular structure also has distinctive 3D adaptive behaviors. If the seam is not sealed, the strain at x direction can drive an angular tube opening/folding at y-z plane. This unique 3D reconfiguration can inspire the development of a strain sensor having dual-level sensitivities coupled with mechanochromic effect and an intriguing artificial mimosa device mimicking tactile response of leaves folding/releasing of plant *Mimosa*. This reconfigurable structure can be further applied into other widespread applications that needs the 3D geometry deforming, shape morphing, actuating, and so on. Furthermore, this 3D tubular structure, can enclose arbitrary electrode patterns that precoated on the 2D precursor, demonstrating high compatibility with modern 2D processing technologies. If the seam is sealed, this tubular structure can act as an adaptive soft scaffold to provide the electrodes with good stretchability, loading capacity, and stimuli responsive chromic external skin. Thus, a highly stretchable tubular tactile switch and stretchable tubular supercapacitor with dual-responsive skin with high specific capacitance were developed. This "coated and wrapped" 3D device design strategy can be readily materialized from the common 2D methods and it's believed that it will inspire numerous other 3D stretchable electronics with unprecedented functionalities. Herein, since this 3D tubular structure manifested marvelous advantages in the new materials/devices development, such as the multi-dimensional shape/motion adaptions, high compatibility to modern 2D technologies, being as a versatile soft scaffold with outstanding stretchability, loading capacity and stimuli response properties, suitable for unconventional stretchable interactive electronics.

EXAMPLES

1. The Preparations of the Wrinkle-Driven 3D Tubular Structure.

Figure 2:
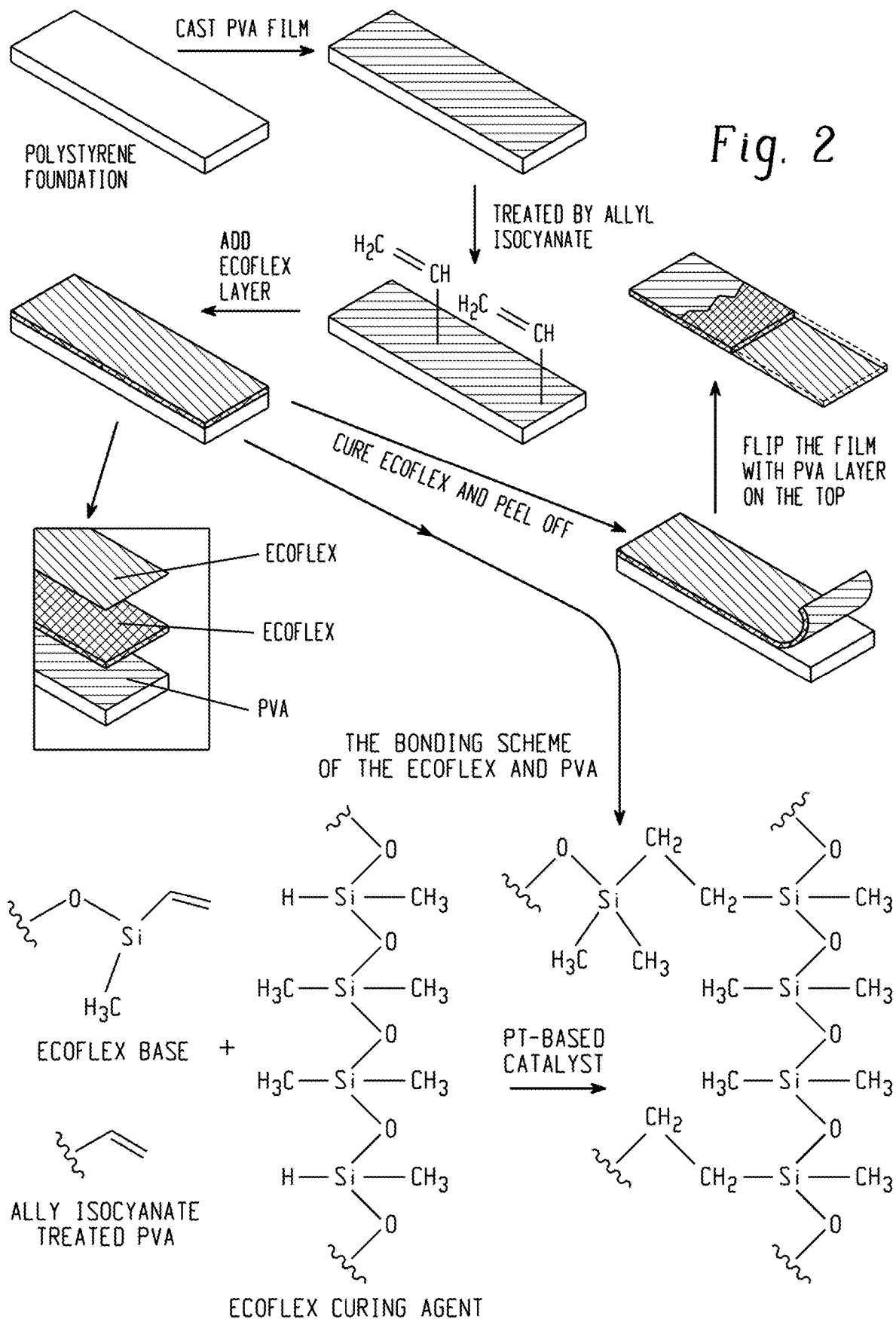
FIG. 2 The preparation schematic of the PVA-Ecoflex® bilayer precursor film with covalent bonding, the PVA layer is a first polymer precursor layer bonded to Ecoflex®, which is a first elastomer precursor layer.

As shown in FIG. 2, the Poly (vinyl alcohol) (PVA) (KURARAY POVAL™ 28-99, $M_w$~145,000 (weight average molecular weight)) film with a thickness of ca. 3.25 μm was cast (10 mg/mL aqueous solution was used) on a pre-cleaned polystyrene petri dish foundation followed by the treatment of allyl isocyanate. Subsequently, a mixture of uncured Ecoflex® 00-30 precursors (all Ecoflex® used in this work contains Part A & Part B with w/w=1:1, Smooth-On, Inc) and red/white Silc-Pig™ pigment (mass ratio of red pigment to white pigment=1.14:1, thickness=0.14 mm, Smooth-On, Inc) with a mass ratio of 26.7:1 was cast atop the allyl isocyanate treated PVA followed by cured at 80° C. for 2 hours. Another similar layer of uncured Ecoflex® precursors and green/white Silc-Pig™ pigment with a mass ratio of 57.1:1 (mass ratio of green to white pigment=1.3:1, thickness=0.15 mm) was cast atop cured the red/white Ecoflex layer followed by cured at 80° C. for 2 hours. The bilayer sheet was then carefully peeled away from the foundation and cut into a size of 2.5 cm length×5.8 mm width followed by mounted on a custom-made stretcher. A cool moisture mist from a humidifier was applied on the top surface for 40 seconds to fully plasticize the PVA film followed by immediately stretching the bilayer into 13.75 cm (450% strain) and then dried. The sample was then released to form a 3D tubular structure.

2. The Preparations of the Tubular Strain Sensor for Finger Motion Monitoring.

The preparations of the PVA-Ecoflex bilayer part is the same as above. The resulting bilayer sheet was then carefully peeled away from the foundation and cut into rectangle shape followed by mounted on a stretcher with a sample dimension of 2.7 cm length×7.6 mm width. A cool mist was applied on PVA surface for 40 s followed by immediately stretching the bilayer into 7.3 cm (170% strain) and then dried. The dried PVA surface was then treated by the 5.26 μl of the 10 mg/ml of glutaraldehyde (GA)/hydrochloric acid (HCl) ethanol solution (GA:HCl mass ratio=1.68:1) followed by fully released to form tubular structure. A thickness of 3.5 μm of conductive carbon grease (MG Chemicals) was coated on the top and side of tube's seam. The sample was then re-stretched to the tube just close state and then attached atop a 3M™ VHB™ 4910 substrate by silicone adhesive. The resulting structure was cut down into with a length of 5.8 mm. To sense the finger motion, the device was adhered on a dummy finger with silicone adhesive.

3. The Preparations of the Artificial Mimosa.

Figure 15:
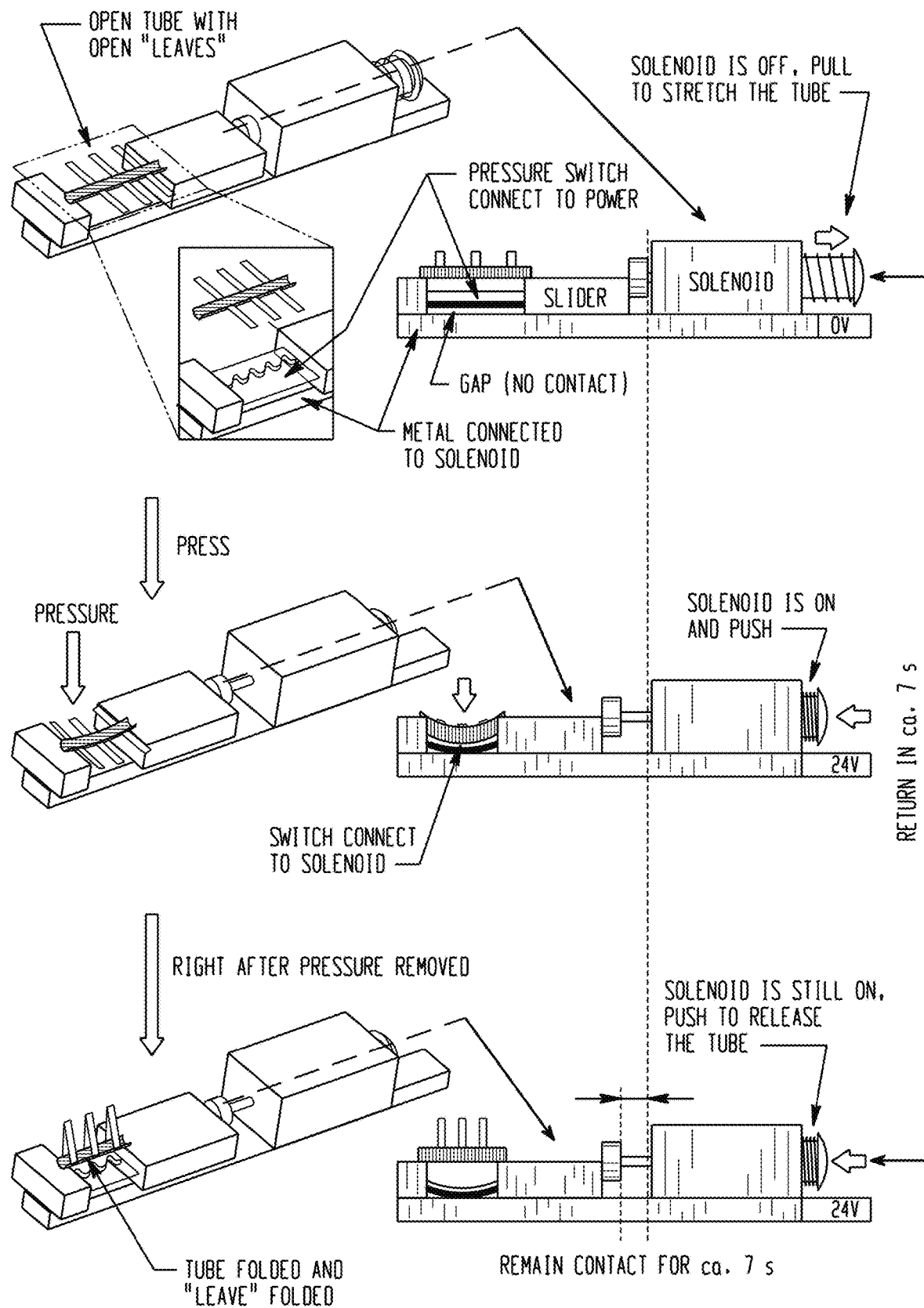
FIG. 15 illustrates the working mechanism of artificial mimosa.
Figure 16A:
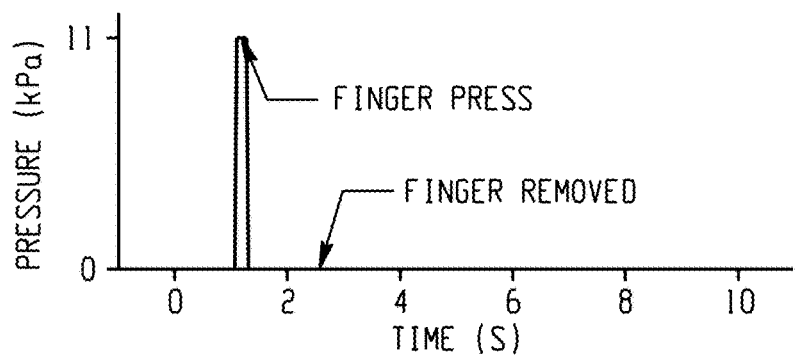
FIG. 16A, FIG. 16B, and FIG. 16C illustrate one sample of the time dependent variation of the finger pressure, resistance of the pressure switch and the tube's curvature angle as the artificial mimosa activated.
Figure 16B:
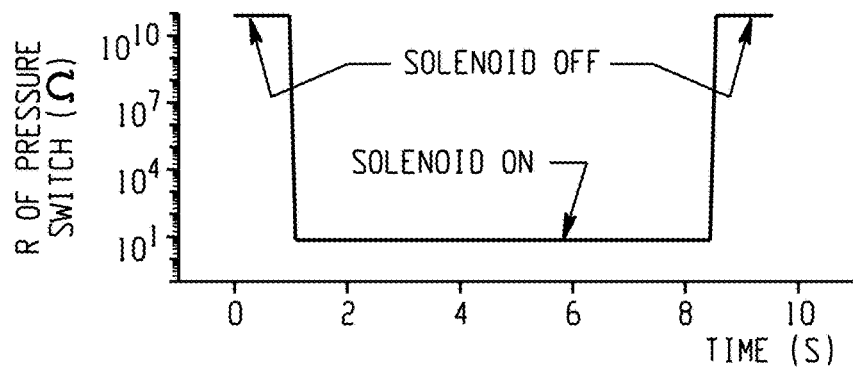
Figure 16C:
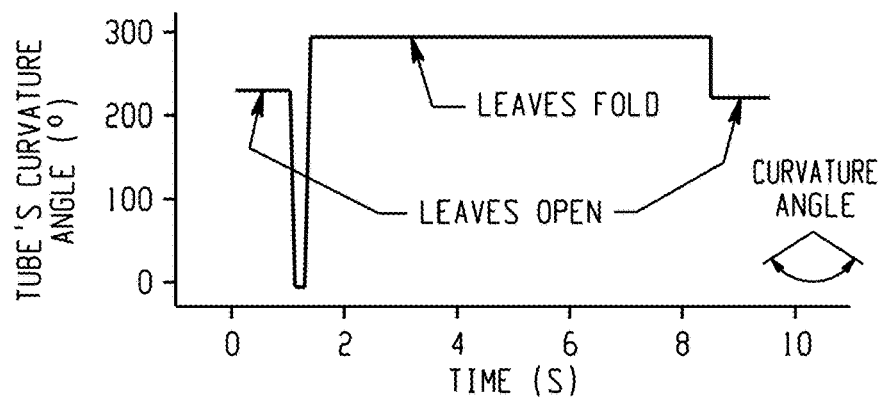
Figure 17:
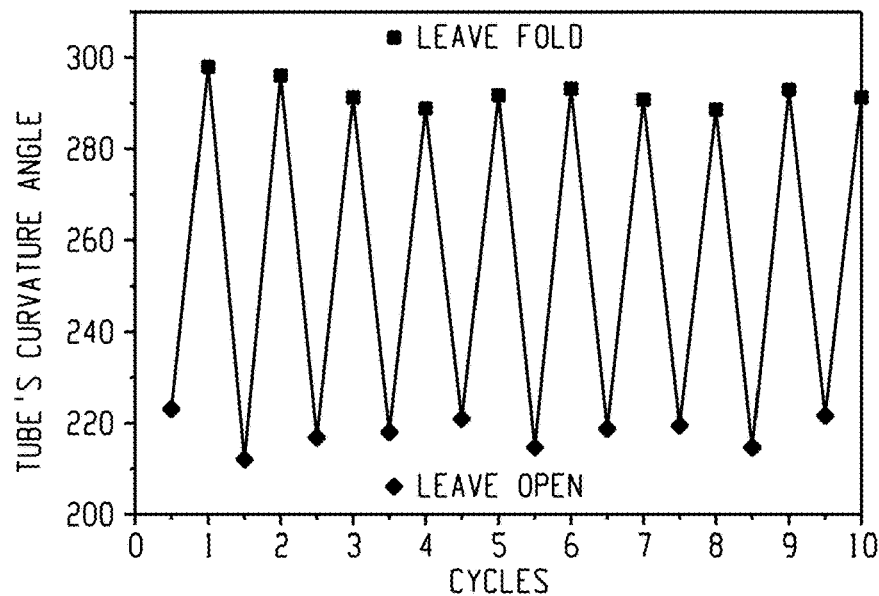
FIG. 17 illustrates the change of the curvature angle with multiple circles of leave fold and open in artificial mimosa.

To prepare the pressure switch, the VHB™ 4910 double-sided adhesive tape was fixed on a stretcher followed by stretched to 185% strain. A flexible conductive thread spun from stainless steel fiber (diameter: ca. 0.12 mm, Sparkfun, Inc.) was adhere to the stretched VHB™ tape. A serpentine thread pattern was achieved as released, allowing the conductor to be re-stretchable within 140% strain. To reduce the VHB adhesion, a layer of silica/PVA composite (weight ratio=95/5, area concentration=0.05 mg/cm$^2$, silica powder from AEROSIL® R202) was then spray coated on the both VHB surfaces except for the conductive thread surface. The conductive thread/VHB structure was then cut into a rectangle size of 2.7 cm length×2.45 cm width and attached to a linear slider (CNBTR Linear Sliding Guideway Rail). And one side of the linear slider was attached to a push pull type tubular solenoid (Uxcell, force: 20N). Thus, the displacement of the conductive thread/VHB structure is compliant with the slider movement that controlled by the solenoid. Also, as shown in FIG. 14 and FIG. 15, the conductive thread side connected to power source was placed towards the metal sliding guide of the slider with a gap of 0.48 cm, and this metal sliding guide is electrically connected to the solenoid. Thus, the solenoid can be connected to the power source as the conductive thread/VHB is pressed to deform and contact the metal sliding guide, and this VHB/conductive thread can be considered as a pressure switch to activate the solenoid motion. Without electrical bias applied, the spring on the solenoid will apply a stretching distance of 1.01 cm to the pressure switch. While with sufficient tactile pressure applied atop the pressure switch area (>11 kPa), the solenoid is on and will apply 0.5 cm releasing distance to the pressure switch as shown in FIG. 14 and FIG. 15. After the pressure switch was installed and the solenoid was off, the tubular structure with three light-weight green plastic leaves on both sides was stretched until the leaves open degree at 106° and then placed right atop the position of conductive thread of pressure switch with the two ends attached on the slider as shown FIG. 14 and FIG. 15 (the preparation of tubular structure method is the same as that of the tubular strain sensor; the size of each leaf is 8.8 mm length×1.7 mm width). Thus, without bias applied, the pre-stretching strain will make the tube and the green leaves open. As a sufficient tactile pressure (11 kPa was created as finger touch down in FIG. 14) applied atop the tubular structure, solenoid will be on. Right after the pressure removed, the slow relaxation of VHB tape will allow the tactile switch to keep contacting the metal sliding guide for ca. 7 seconds. Thus, as the solenoid keep on for ca. 7 seconds after pressure removed, the tubular structure will be released with 0.5 cm distance with concomitant leaves close due to the partially folding of the tube.

4. The Preparations of the Highly Stretchable Tubular Tactile Switch and the Wearable Tactile Response Electroluminescent Device.

The casting of the PVA film on the foundation and allyl isocyanate treatment is the same with the aforementioned sample. Subsequently, the uncured pure Ecoflex® 00-30 precursors with a thickness of 0.6 mm was cast atop the treated PVA film followed by cured at 80° C. for 2 hours. The cured bilayer sheet was then carefully peeled away from the foundation and followed by mounted on custom-made stretcher with a size of 2.74 cm length×10.5 mm width. A cool mist was applied on the PVA surface for 40 seconds followed by immediately stretching the bilayer into 15 cm (450% strain) and then dried. A stencil mask was applied atop the PVA surface followed by successively spray coating of 4 layers of different materials: (1) 4.75 μm of flexible adhesive (AA-BOND 2170 Flexible Plastic Bonder Epoxy Adhesive); (2) 12.5 μm of silver epoxy (AA-DUCT 916 Flexible silver epoxy); (3) 1.8 μm of silver ink layer (CI-1036 highly conductive flexible silver ink, Engineered Materials Systems, Inc.); and (4) 1.125 μm of carbon ink layer (CI-2051 conductive carbon ink, Engineered Materials Systems, Inc.); and cured at ambient environment. The stencil mask was then removed to allow the formation of two opposing parallel electrodes. The sample was then released to form a tubular structure followed by sealing the seam with silicone adhesive (Permatex 80050 Clear RTV Silicone Sealant). To characterize this device, the tubular sample was released from the stretcher and rotated for 90 degree around the x axis and then re-mounted on the stretcher for testing the tactile pressure response. The wearable tactile responsive electroluminescent device was prepared by attaching the two ends of tactile switch atop a PDMS strip and an Ecoflex ° strip (both strip sizes: 8 cm length×7 mm width×1 mm thickness). The device can be worn by expanding the gap between the PDMS and Ecoflex strip and put the hand/arm inside the space of two strips. And it was electrically connected to a wearable electroluminescent panel (Adafruit, Inc.).

5. The Preparations of the Dual-Responsive Stretchable Tubular Supercapacitor

As shown in FIG. 23, the casting of the PVA film on the foundation and allyl isocyanate treatment was the same with the aforementioned samples, and then a rectangle stencil mask (width=2 mm) was placed in the middle followed by the casting and curing of a 0.24 mm thick layer of Ecoflex®/red thermochromic/normal orange dye (mass ratio=80:3:1) (red thermochromic pigment was purchased from Acumind Pigments, Inc. and normal non-thermochromic orange dye was from Mineral Makeup, Inc.) followed by a 20 min UVO treatment (Novascan PSD digital UV ozone system). A layer of mirror chrome (containing metal flakes, from Spaz Stix, Inc.; thickness 40 nm) were then spray coated atop the Ecoflex® layer by an airbrush style spray-gun (Master Airbrush G444-SET, equipped with a 0.5 mm needle nozzle and a Royal Mini Air Compressor, TC-20B). A layer of TiO$_2$ (99.9%, CR828, Tronox)/polyvinyl butyral (PVB) (Mowital® B 60 HH, Kuraray, mass ratio of PVB/TiO2=4:1, 10 mg/mL TiO$_2$/PVB ethanol suspension were used) composite with a thickness of ca. 890 nm was then spray coated atop mirror chrome form a light shield layer. A layer of pure Ecoflex® (thickness 6.6 μm, 100 mg/mL of Ecoflex®/hexane solution) was then spray coated atop the TiO$_2$/PVB layer and then cured at 80° C. for 30 min followed by a 20 min UVO treatment. Subsequently, the green thermochromic pigment layer (thickness 3.3 μm, purchased from Acumind Pigments, Inc.) was spray coated atop the cured Ecoflex® layer. Upon the removal of stencil mask and another UVO treatment, a layer of uncured Ecoflex® with a thickness of ca. 0.28 mm was cast atop the pigment layer and middle empty area used to cover by stencil mask, followed by cured at 80° C. for 2 h. The bilayer sheet was then carefully peeled away from the foundation followed by mounted on a custom-made stretcher with a size of 2.74 cm length×10.6 mm width. A cool moisture mist from a humidifier was applied on the PVA surface for 40 s followed by immediately stretching the bilayer into 15 cm (450% strain) and then dried. A stencil mask was applied atop the PVA surface followed by the spraying coating of the same thickness of flexible adhesive, silver epoxy, silver ink and carbon ink layers as that for tactile switch. Subsequently, the PEDOT:PSS and $RuO_2$ (mass ratio of PEDOT:PSS/$RuO_2$=8/2) was cast atop the carbon ink layer. The preparation of $RuO_2$ nanoparticles is the same with the sol-gel process and low-temperature annealing method previous introduced. The sample was then released to form a tubular structure and the seam was sealed by silicone adhesive follow by injecting 115 μl of ionic liquid 1-Ethyl-3-methylimidazolium tetrafluoroborate ($EMIMBF_4$, Fisher Scientific, Inc.) inside the tube as electrolyte with the two ends of tubes also sealed.

Characterizations:

The optical microscope images of all the top-view morphologies of tubular devices were recorded on an optical microscope (AmScope ME 520TA) under reflective mode. Electrical resistance test was done using a Keithley 2400 measurement set-up or a VA38 high accuracy digital multimeter with USB interface. The mechanical pressure and corresponding compression distance measurement was conducted on an Instron 5860 universal testing system. The electrochemical performance of the dual-responsive supercapacitor was done on a CHI 660A electrochemical workstation. All the digital photos and movies were captured by an iPhone 6 Plus smart phone.

Figure 28:
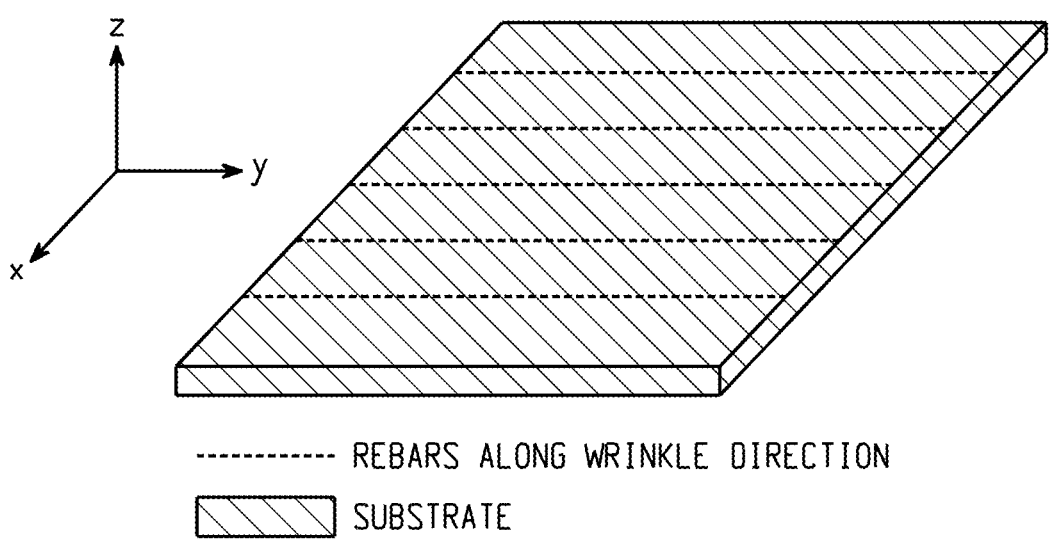
FIG. 28 The schematic for the FE model (Scheme 1).

Simulation Method for Wrinkle-Driven Tubular Structure with 450% Pre-Stretching Strain:

The curved tube response is simulated through a nonlinear analysis using the commercial finite element software, ABAQUS (version 6.14-2). The bilayer material is modeled as a 3D solid shown in Scheme. 1 (FIG. 28) and meshed using the 8-node linear brick, hybrid, constant pressure element, C3D8H. The wrinkles are captured in the experiments once the bilayer system is released due to the compression developed in the PVA film. In the simulation, it is assumed that the wrinkled film cannot take any compression load along the x-direction shown in Scheme. 1 (FIG. 28). Rebars are used to mimic the mechanical behavior of the wrinkled surface. The thickness of the rebar (t) is the same as that of the PVA film. The spacing and the area of the rebars are computed using Eqs. (1) and (2), respectively. The spacing (s) between the rebars is equal to the wavelength of the wrinkles (λ). A is the area per bar.

$$s = \lambda = 2\pi t \left(\frac{\bar{E}_f}{3\bar{E}_s}\right)^{1/3} \quad \text{Eq. (1)}$$

$$A = \lambda t \quad \text{Eq. (2)}$$

The material properties for the rebars are the same as those of the PVA. The substrate is modeled as a hyperelastic material using the neo-Hookean model. The material constants used in the simulation are listed in the Table 1. The pre-stretching of the bilayer material system is modeled as a pre-defined stress field along the x-direction. The pre-defined stress is computed using Eq. (3) based on the uniaxial tension response of the neo-Hookean material.

$$\sigma_{xx} = \frac{2C_1}{J^{5/3}}\left(\lambda^2 - \frac{J}{\lambda}\right) \quad \text{Eq. (3)}$$

Here, $\sigma_{xx}$ is the Cauchy stress serving as the pre-defined stress, λ is the pre-stretch ratio, and J is the volumetric change ratio which is solved based on Eq. (4).

$$D_1 J^{8/3} - D_1 J^{\frac{5}{3}} + \frac{C_1}{3\lambda}J - \frac{C_1\lambda^2}{3} = 0 \quad \text{Eq. (4)}$$

TABLE 1

The material properties used in the simulation.

| | | Value | Unit |
|---|---|---|---|
| Rebars | Young's modulus | 1000 | MPa |
| | Poisson's ratio | 0.3 | — |
| Substrate | $C_1$ | 0.03 | MPa |
| | $D_1$ | 0.0001 | $MPa^{-1}$ |

The materials, methods, and uses are further illustrated by the following Aspects, which are non-limiting:

Aspect 1: A stretchable three-dimensional tubular structure, comprising: a multilayer film comprising a first polymer layer or a first polymer composite layer bonded to a first elastomer layer, wherein the first polymer composite layer comprises a polymer and an inorganic material; the multilayer film is substantially to fully tubular in structure comprising an openable seam; the first elastomer layer forming an outer surface of the tubular structure; and the first polymer layer or first polymer composite layer forming an inner surface of the tubular structure, wherein the inner surface has a wrinkled morphology. The stretchable three-dimensional tubular structure with an inner surface having a wrinkled morphology can be prepared by pre-stretching and releasing a multilayer precursor. The wrinkled surface can have an orientation substantially vertical to the longitudinal releasing (x−) direction.

Aspect 2: The structure of Aspect 1, wherein the stretchable three-dimensional tubular structure is formed by pre-stretching and releasing a multilayer precursor film for one or more cycles to form the multilayer film that is substantially to fully tubular in structure and the inner surface has a wrinkled morphology.

Aspect 3: The structure of Aspect 1 or 2, wherein the first polymer layer or the first polymer composite layer comprises polyvinyl alcohol, polyvinyl butyral, polycarbonate, poly(methyl methacrylate), a polyacrylate, polystyrene sulfonate, polyacrylic acid, polyethylenimine, any non-crosslinked polymer, or a combination thereof.

Aspect 4: The structure of Aspect 1, 2, or 3, wherein first elastomer layer comprises a silicone rubber, a polyurethane rubber, a polyacrylate rubber, an acrylic rubber, natural rubber, a fluoroelastomer, ethylene-propylene rubber (EPR), ethylene-butene rubber, ethylene-propylene-diene monomer rubber (EPDM), epichlorohydrin rubber, an acrylate rubber, hydrogenated nitrile rubber (HNBR), a styrene-butadiene-styrene (SBS), a styrene-butadiene rubber (SBR), a styrene-(ethylene-butene)-styrene (SEBS), an acrylonitrile-butadiene-styrene (ABS), an acrylonitrile-ethylene-propylene-diene-styrene (AES), a styrene-isoprene-styrene (SIS), styrene-(ethylene-propylene)-styrene (SEPS), methyl methacrylate-butadiene-styrene (MBS), a high rubber graft (HRG), a polydimethylsiloxane (PDMS), or a combination thereof.

Aspect 5: The structure of any one of Aspects 1-4, wherein the first elastomer layer further comprises a dye, a pigment, a thermochromic colorant, or a combination thereof.

Aspect 6: The structure of any one of Aspects 1-5, wherein the multilayer film further comprises one or more additional polymer layers, polymer composite layers, one or more additional elastomer layers, or a combination thereof.

Aspect 7: The structure of any one of Aspects 1-6, further comprising one or more of a reflective or mirror layer; a metal oxide layer; a thermochromic layer; a second elastomer layer; an adhesive layer; a metal coating layer; a carbon coating layer; a conducting polymer layer; and an electroactive layer.

Aspect 8: The structure of Aspect 7, wherein the adhesive layer, the metal coating layer, the carbon coating layer, the conducting polymer layer, and the electroactive layer are positioned on the side of the multilayer film closest to the first polymer layer or first polymer composite layer.

Aspect 9: The structure of Aspect 7, wherein the metal oxide layer, the reflective or mirror layer, the thermochromic layer, and the second elastomer layer are positioned on the side of the multilayer film closest to the first elastomer layer.

Aspect 10: The structure of any one of Aspects 1-8, wherein stretching/releasing strain at x axis direction can drive angular tube opening/folding at y-z plane at the openable seam, or wherein the openable seam is sealed by stretchable adhesive to form an interior region of the structure and upon stretching and releasing, the seam remains closed and the tubular structure remains closed or folded.

Aspect 11: The structure of Aspect 10, wherein the interior region of the structure comprises an electrolyte.

Aspect 12: An article comprising the structure of any one of Aspects 1-11, wherein the article is a stretchable electronic device, a supercapacitor, a tactile switch, a pressure switch, or a strain sensor.

Aspect 13: A method of making a stretchable three-dimensional tubular structure of any one of Aspects 1-11, comprising: providing a multilayer precursor film comprising a first polymer precursor layer bonded to a first elastomer precursor layer; pre-stretching and releasing the multilayer precursor film to form the multilayer film that is substantially to fully tubular in structure and comprises an openable seam, the first elastomer layer forming an outer surface of the tubular structure and the first polymer layer forming an inner surface of the tubular structure, wherein the inner surface has a wrinkled morphology; and optionally repeating the pre-stretching and releasing for 2 or more cycles.

Aspect 14: The method of Aspect 13, further comprising: providing the first polymer precursor layer; and bonding the first elastomer precursor layer on a surface of the first precursor polymer layer to form the multilayer precursor film.

Aspect 15: The method of Aspect 14, further comprising applying one or more of the following to the multilayer precursor film: a reflective or mirror layer; a metal oxide layer; a thermochromic layer; a second elastomer layer; an adhesive layer; a metal coating layer; a carbon coating layer; a conducting polymer layer; and an electroactive layer.

Aspect 16: The method of Aspect 15, wherein the adhesive layer, the metal coating layer, the carbon coating layer, the conducting polymer layer, and the electroactive layer are positioned on the side of the multilayer precursor film closest to the first polymer precursor layer and are applied after pre-stretching and before releasing.

Aspect 17: The method of Aspect 15, wherein the metal oxide layer, the reflective or mirror layer, the thermochromic layer, and the second elastomer layer are positioned on the side of the multilayer precursor film closest to the first elastomer precursor layer and are applied before pre-stretching the multilayer precursor film.

Aspect 18: The method of any one of Aspects 13-17, wherein the first polymer precursor layer is a first polymer composite precursor layer comprising a polymer and an inorganic material.

Aspect 19: The method of any one of Aspects 13-18, wherein the pre-stretching comprises applying up to a 900% uniaxial tensile strain, specifically up to about 450% uniaxial tensile strain, specifically up to about 200% uniaxial tensile strain, specifically about 50% to about 100% uniaxial tensile strain, specifically about 5% to about 50% uniaxial tensile strain.

Aspect 20: The method of any one of Aspects 13-19, wherein the stretchable three-dimensional tubular structure can undergo a reversible mechanochromic color change by the application of an up to 200% uniaxial tensile strain and optionally wherein the stretchable three-dimensional tubular structure can undergo a reversible thermochromic color change.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention. The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group. "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or." The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

The modifier "about" used in connection with a quantity is inclusive of the stated value and has the meaning dictated by the context (e.g., includes the degree of error associated with measurement of the particular quantity). The notation "±10%" means that the indicated measurement can be from an amount that is minus 10% to an amount that is plus 10% of the stated value. The terms "front", "back", "bottom", and/or "top" are used herein, unless otherwise noted, merely for convenience of description, and are not limited to any one position or spatial orientation. "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs. A "combination" is inclusive of blends, mixtures, alloys, reaction products, and the like.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A method of making a stretchable three-dimensional tubular structure, comprising:
providing a multilayer precursor film comprising a polymer precursor layer bonded to an elastomer precursor layer;
pre-stretching and releasing the multilayer precursor film to form the multilayer film that is substantially tubular in structure and comprises an openable seam, the elastomer layer forming an outer surface of the tubular structure and the polymer layer forming an inner surface of the tubular structure, wherein the inner surface has a wrinkled morphology; and
optionally repeating the pre-stretching and releasing for 2 or more cycles.

2. The method of claim 1, further comprising:
providing the polymer precursor layer; and
bonding the elastomer precursor layer on a surface of the precursor polymer layer to form the multilayer precursor film.

3. The method of claim 1, further comprising applying one or more of the following to the multilayer precursor film:
a reflective or mirror layer;
a metal oxide layer;
a thermochromic layer;
a second elastomer layer;
a metal coating layer;
a carbon coating layer;
a conducting polymer layer; and
an electroactive layer.

4. The method of claim 1, wherein an adhesive layer, a metal coating layer, a carbon coating layer, a conducting polymer layer, or an electroactive layer are positioned on the side of the multilayer precursor film closest to the polymer precursor layer and are applied after stretching and before releasing.

5. The method of claim 3, wherein the metal oxide layer, the reflective or mirror layer, the thermochromic layer, and the second elastomer layer are positioned on the side of the multilayer precursor film closest to the elastomer precursor layer and are applied before stretching the multilayer precursor film.

6. The method of claim 1, wherein the polymer precursor layer is a polymer composite precursor layer comprising a polymer and an inorganic material.

7. The method of claim 1, wherein the pre-stretching comprises applying up to a 900% uniaxial tensile strain, specifically up to about 450% uniaxial tensile strain, specifically up to about 200% uniaxial tensile strain, specifically about 50% to about 100% uniaxial tensile strain, specifically about 5% to about 50% uniaxial tensile strain.

8. The method of claim 1, wherein the stretchable three-dimensional tubular structure can undergo a reversible mechanochromic color change by the application of an up to 200% uniaxial tensile strain and optionally wherein the stretchable three-dimensional tubular structure can undergo a reversible thermochromic color change.

* * * * *